United States Patent [19]

Schauder

[11] Patent Number: 4,962,339
[45] Date of Patent: Oct. 9, 1990

[54] POLE-TYING CURRENT CONTROL APPARATUS

[75] Inventor: Colin D. Schauder, Murrysville Boro, Pa.

[73] Assignee: Westinghouse Electric Corp., Pittsburgh, Pa.

[21] Appl. No.: 373,018

[22] Filed: Jun. 26, 1989

Related U.S. Application Data

[62] Division of Ser. No. 87,939, Aug. 21, 1987, Pat. No. 4,885,518.

[51] Int. Cl.$^5$ .............................................. H02P 5/40
[52] U.S. Cl. .................................. 318/798; 318/806; 363/58
[58] Field of Search .................. 318/798, 806; 363/56, 363/57, 58, 137, 138, 96–98

[56] References Cited

U.S. PATENT DOCUMENTS 4,139,885 2/1979 Overzet et al. ........................ 363/58
4,675,799 7/1987 Suzuki et al. ........................ 363/58

Primary Examiner—David Smith, Jr.
Attorney, Agent, or Firm—C. M. Lorin

[57] ABSTRACT

An induction motor torque/flux control system the motor flux is forced down while accelerating and force up while decelerating to maintain a required flux level at all speeds. This is achieved through vector control by generating a direct current component in relation to the flux demand while imposing limits thereto corresponding to the maximum desirable resultant current vector, and by generating a quadrature current component which is held between limits defined by the sum of the squares of the two current components. The three-phase currents of the motor generated by vector control transformation are used to control a voltage-source inverter in a bang-bang fashion. The conventional bang-bang technique is improved by typing up one pole while controlling in the bang-bang mode the two other poles. To this effect the motor back emf is detected when the poles are simultaneously tied to one of the DC link terminals, and the tied-up pole is selected by the emf so detected.

5 Claims, 16 Drawing Sheets

POLE-TYING CURRENT CONTROL APPARATUS

This is a division of application Ser. No. 07/087,939 filed Aug. 21, 1987, now U.S. Pat. No. 4,885,518.

TECHNICAL FIELD

The present invention relates to induction motor drives in general, and more particularly to an induction motor torque and flux system, and to current control apparatus for such system.

BACKGROUND OF THE INVENTION

Field-oriented control for an AC motor drive is well known. Based on a reference frame which rotates at the speed of the rotor flux, a flux component and a torque component of the stator currents oriented upon such reference frame are calculated and used to control the motor flux and the resulting torque. See for instance FIELD-ORIENTED CONTROL OF A STANDARD AC MOTOR USING MICROPROCESSORS by R. Gabriel, W. Leonard and C. J. Nordby, IEEE Trans. IA-16, pages 186–192, March/April 1980; INTRODUCTION TO FIELD ORIENTATION AND HIGH PERFORMANCE AC DRIVES by D. W. Novotny and R. D. Lorenz, IEEE Industry Applications Society, October 6–6, 1985, Toronto, Canada, Section 2, pages 2-1 to 2-65. The two afore-cited publications are hereby incorporated by reference. The afore-mentioned W. Leonard and the D. W. Novotny and R. D. Lorenz publications are hereby incorporated by reference.

The assumption is that the motor flux $\psi^*$ and $T^*$ demand signals can be instantaneously satisfied under the further assumption that the mathematical model used is accurate, that the parameter T2, namely the rotor time constant, is known and that the specified direct and quadrature current components $i_d$ and $i_q$ can be instantaneously injected into the stator winding.

Direct and quadrature stator currents have been generated for control according to the vector control method described in U.S. Pat. No. 4,456,868 of Yamamura et al. The purpose, there, is to improve the response on the torque.

It is also known from U.S. Pat. No. 4,125,796 of Nagase et al. to generate a desired torque by calculating a current pattern signal, also by decomposing the motor current into a flux oriented direction and in quadrature thereto.

U.S. Pat. No. 4,451,771 of Nagase et al. discloses the generation of a current correction signal applied to the current control signal derived according to the motor control method in an AC motor drive.

The object of the present invention is to achieve a speed regulator providing dynamic control of both the motor speed and the magnetic flux level, thereby to ensure that control is maintained over the field-weakening operative range of the motor drive.

The present invention involves a speed regulator system wherein both the torque and flux references are variables. The torque demand is derived from the speed regulator error signal and the motor flux reference is a predefined function of the motor speed.

As long as in the motor drive, the flux is held constant, or merely gradually changing, the prior art technique of vector control can accommodate speed regulation. If, however, the speed is called to accelerate rapidly, or conversely, to decelerate rapidly, the problem arises of dynamically forcing the flux to match such circumstance. Since there are two variable current components, the problem translates itself into how to selectively exercise the compensating effect on those two components so as to cause the resultant vector to match the speed requirements. The major obstacle with such rapidly changing demand is to prevent the current from exceeding acceptable limits. Therefore, the question arises as to how the total current should be limited to a safe maximum value. Imposing constant limits on both components would unnecessarily restrict one component in magnitude whenever the demand for the other is low.

SUMMARY OF THE INVENTION

The invention relates to an AC induction motor drive including first means responsive to a flux demand for generating a first signal representative of a direct component reference current; second means responsive to a torque demand for generating a second signal representative of a quadrature component reference current; third means responsive to a speed demand for generating a third signal representative of a position angle characterizing the current resultant vector of said direct and quadrature components; and fourth means responsive to said first, second and third signals for generating three coordinate phase currents for the motor drive. According to the invention, means is provided within the first means for dynamically responding to the flux demand and first limiting means is provided in response to said dynamically responding means for limiting the first signal in magnitude within a predetermined maximum value (LIM). Second limiting means is provided responsive to the first signal and operative upon the second means for limiting the second signal so that the resultant vector remain within the value $ALIM = (LIM^2 - i_d^{*2})$, where $i_d^*$ is said first signal.

Preferably, a microcomputer is used to compute $ALIM = \sqrt{(LIM^2 - i_d^2)}$.

The invention resides in pole-tying current control apparatus is provided with a voltage-source inverter generating the three-phase currents of the motor under a bang-bang technique, the operation of which is enhanced by control means operated cyclically upon two of said poles while connecting one phase of the motor to one of the voltage-source terminals through the third of the poles, the roles of said two and third poles being sequentially permutated during such cyclic operation.

BRIEF DESCRIPTION OF THE DRAWINGS

Preferred embodiments of the invention will now be described by way of example only, with reference to the accompanying drawings in which.

DESCRIPTION OF THE PREFERRED EMBODIMENTS

Figure 1:
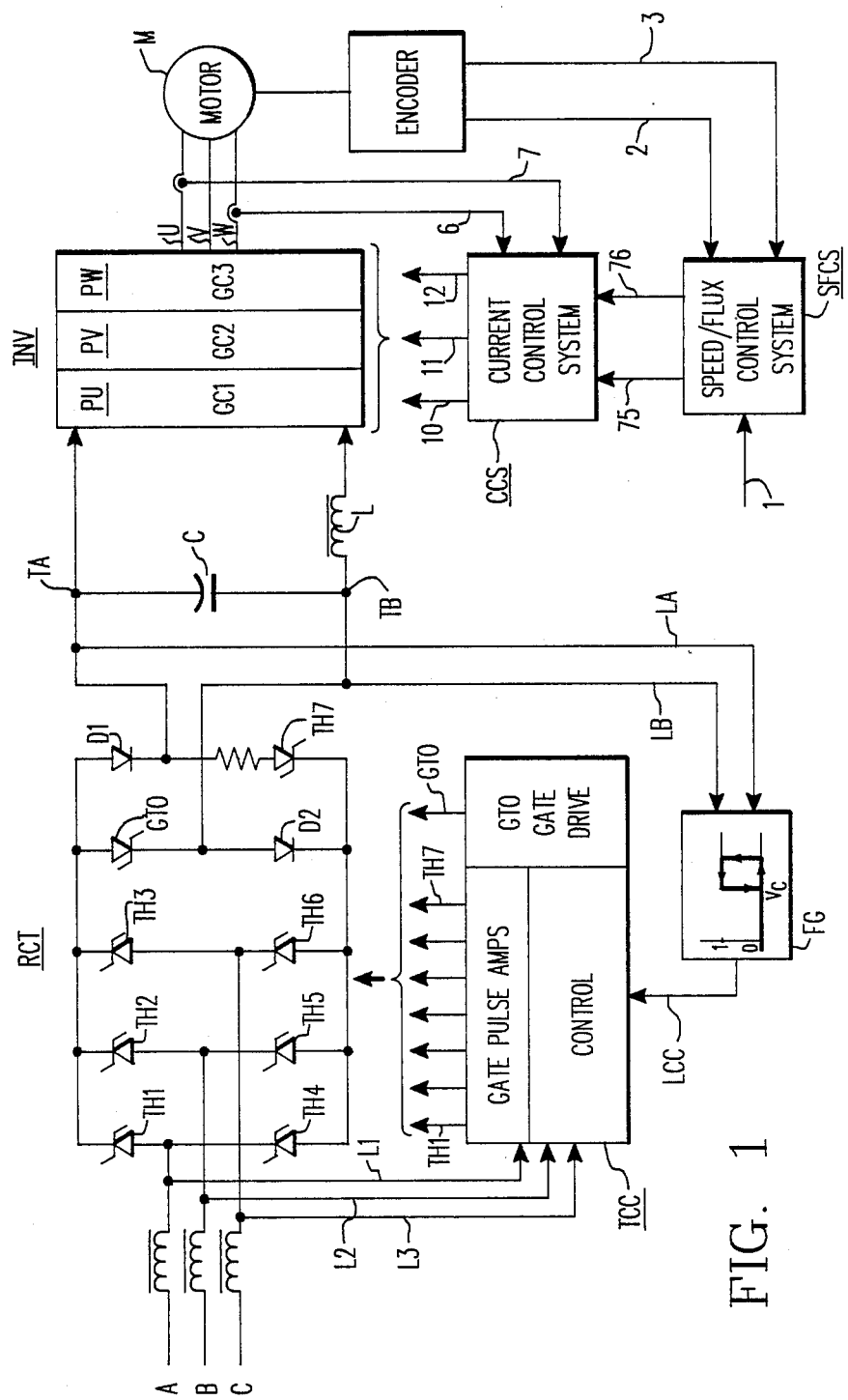
FIG. 1 is a block diagram representation of an AC motor drive embodying the speed/flux control system according to the present invention.

Referring to FIG. 1 a speed regulator system is shown embodying dynamic control according to the invention for both the motor speed and its magnetic flux level. As explained hereinafter, within the speed/flux control system SFCS the torque demand is derived from a speed regulator error signal, while the motor flux reference is obtained according to a predefined function of the motor speed. Both the torque and flux references are used as variables, as explained hereinafter.

In the illustrated voltage source inverter and variable frequency AC motor drive of FIG. 1, the rectifier RCT includes a combination of a GTO device and a thyristor TH7 to ensure the passing of regenerative energy from the inverter side, while providing a zero-current intermediate stage in the commutation process and maintaining maximum voltage on the DC-link capacitor C between successive such zero-current stages. This two-quadrant power conversion aspect of a voltage-source inverter motor drive has been described in U.S. Pat. No. 4,697,131 of Colin D. Schauder. For the purpose of the description of this aspect of FIG. 1, the Colin D. Schauder patent is hereby incorporated by reference.

Thus, from the three-phase AC industrial lines A, B, C, a rectifier RCT provides, with a capacitor C, a DC-link voltage between DC terminals TA, TB. The voltage source so designed includes a reactor L (as generally known) and the DC voltage is converted by an inverter INV into a three-phase AC power supply (U, V, W) for the AC motor M (as generally known). The rectifier includes a thyristor bridge TH1-TH6 and two serially-connected networks, one having a nodal point connected to the negative terminal TB and situated between a GTO device and a device D2, the latter across the RCT bridge, the second having a nodal point connected to the positive terminal TA and situated between a diode D1 and a thyristor TH7, the latter across the RCT bridge. This is as described in the incorporated by reference patent.

A thyristor control circuit TCC responding to the AC phase voltages derived on lines L1, L2, L3 and to a power flow direction control signal applied on line $L_{cc}$, is generating gating signals for thyristors TH1-TH7 and the GTO device. Depending upon whether the motor drive is in the forward mode, or in the regenerative mode, the signal of line $L_{cc}$ is a Zero, or a ONE, as outputted by a function generator FG responding to the value of the voltage $V_c$ exiting across terminals TA, TB, as derived between lines LA and LB.

As explained hereinafter, the invention provides for a speed/flux control system SFCS responding to a speed reference on line 1 and to the actual speed of the motor as sensed between lines 2 and 3 from an encoder ("type "H25/encoder BEI") coupled to the stator and the rotor of the motor. Two phase representative currents (ia, ic) are generated on lines 75 and 76 by the speed/flux control system SFCS0 and are used by a current control system CCS to provide control signals on lines 10, 11, 12, in relation to the currents sensed on lines 6 and 7 on phases V and W of the stator of the motor, so as to control a voltage-source inverter INV. As explained hereinafter, the bang-bang technique is used by the current control system CCS, preferably with the improvement according to another aspect of the present invention consisting in cyclically tying one of the three poles PU, PV, PW of the inverter, while controlling the two others, via their corresponding gating circuits (GC1, GC2, GC3). This aspect of the invention will be explained hereinafter.

Figure 2:
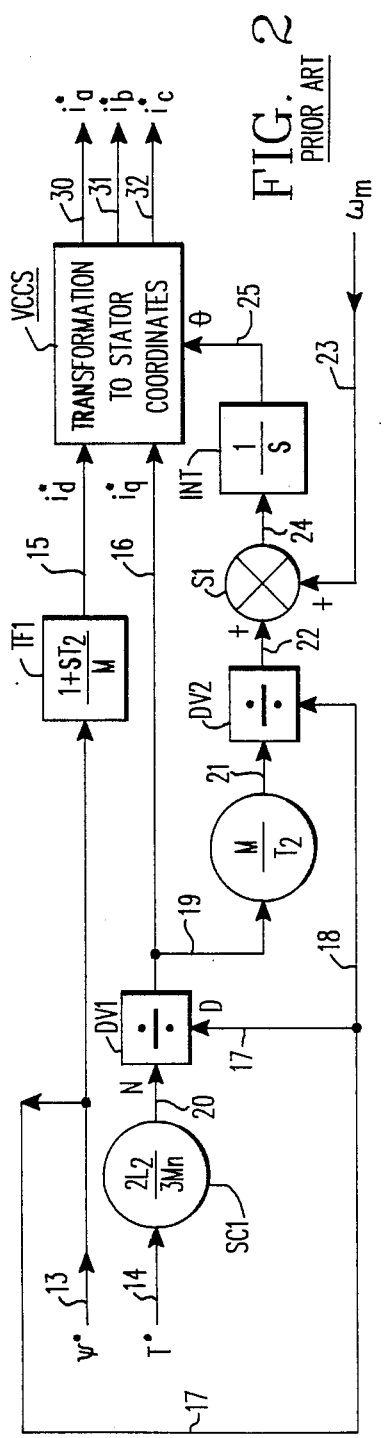
FIG. 2 shows in block diagram the concept of induction motor torque control using an impressed stator current vector as in the prior art.

Referring to FIG. 2, a block diagram illustrates the concept of vector control in an AC motor drive. The reference signal representing the flux demand $\psi^*$ is applied by line 13 to a transfer function TF1 [function (1+St2/M)] providing on line 15 the direct component $i_d^*$ of the current. The reference signal representing the torque demand T* is applied by line 14, first to a scaling circuit SC1 accounting for the constant 2L2/3M n (where L2 is the three-phase rotor self-inductance, M the three-phase stator/rotor mutual inductance and n the number of pole pairs on the machine), then, to a divider DV1 having the output of line 20 from a scaler circuit SC1 (2L2/3Mn) applied as numerator and the flux demand derived from line 13 applied, thereto by line 17, as the denominator. The result is on line 16 the quadrature component $i_q$ of the current. From this two coordinate system, the vector current control system VCCS converts the system into a three current system (ia, ib, ic, on lines 30, 31, 32, respectively) by reference to the direct and quadrature components resultant vector angle $\theta$ derived on line 25. Angle $\theta$ is obtained as follows: A speed angular velocity $\omega_\mu$ is derived on line 23 from the motor; from the quadrature component $i_q^*$ of lines 19 and 19, after scaling by M/T2 (where $T_2 = L_2/R_2$ with L2 being the rotor inductance and R2 the rotor resistance per-phase) and, after adjustment by taking a correction with the inverse of the flux demand $\psi^*$ (via divider DV2), a speed demand is derived on line 22. The latter is then added (at S1) to the actual speed of line 23 so as to provide at the output a value which is integrated (by 1/s within integrator INT) to convert the speed into a position angle $\theta$ on line 25. From the resultant vector defined by orthogonal components $i_d^*$ and $i_q^*$ (on lines 15, 16) and from the resultant vector angular position $\theta$ (on line 25), are obtained, as generally known, the three-coordinate currents ia, ib, ic of lines 30, 31, 32.

The problem arises as to how the total current should be limited to a safe maximum value. Imposing constant limits on both components would unnecessarily restrict one component in magnitude whenever the demand for the other is low. According to the present invention the resultant vector current in the motor is limited by establishing the flux-demand by priority over the torque-demand. Up to a limit value ($\pm$LIM) flux control is prevailing, thereby ensuring optimum use of the current available from the power source. To this effect, the instantaneous direct component of the current $i_d$ is estimated within its normal limit values ($\pm$LIM) and a limit ($\pm$ALIM) is established for the quadrature component of the current $i_q$ so as not to exceed the assigned id limit (LIM). The quadrature current component limit ALIM is calculated in accordance with the formula:

$$ALIM = \sqrt{LIM^2 - i_d^2}$$

considering that the square of the resultant vector is equal to the sum of the square of its components. As a result, no current is allocated to torque production unless the motor flux has reached the value prescribed for each speed.

The direct current $i_d$ could contain large noise components due to the time derivative of a quantized flux demand derived from a look-up table, for example. As a precautionary measure, according to the invention low-pass filter action is provided introducing a time lag between the flux demand and the actual flux in the machine, and also adapted speed regulation is provided with increased loop gain or decreasing flux, and conversely.

Figure 3:
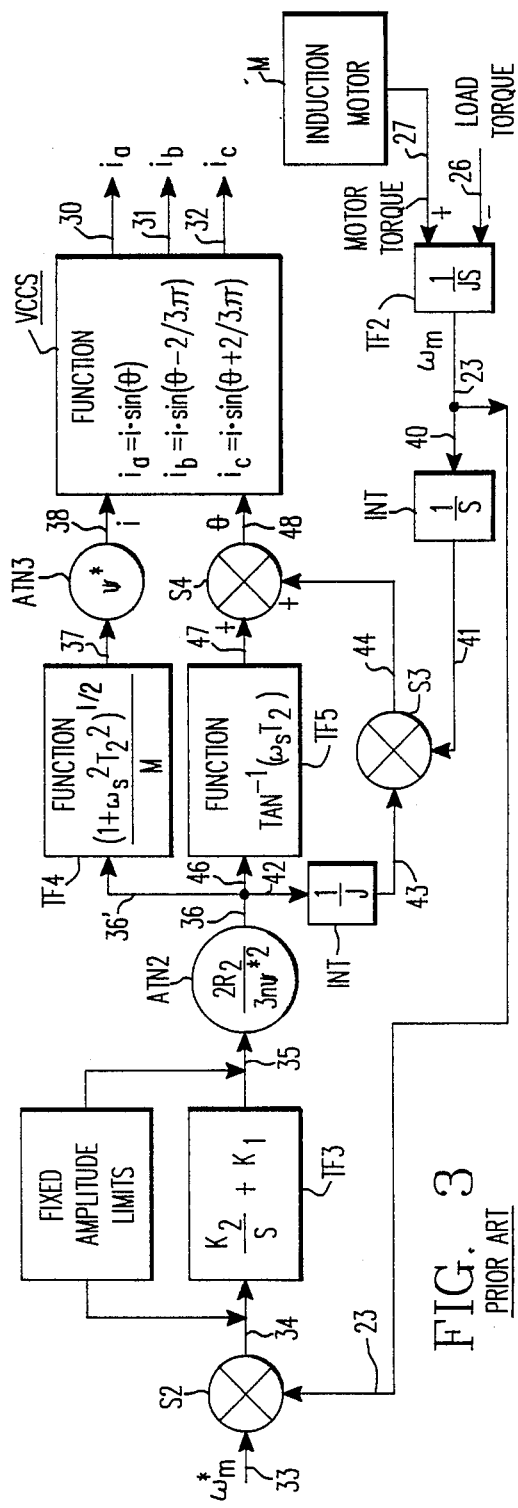
FIG. 3 illustrates a prior art closed loop speed regulator system requiring constant flux operation.

Referring to FIG. 3, a block diagram illustrates a speed/torque control system for induction motor expressed in polar coordinates drive and operating under constant flux demand. The reference speed $W_m^*$, applied on line 33, is compared by subtractor S2 with the actual mechanical speed $W_m$ derived on line 23, thereby obtaining on line 34 a speed error. The actual frequency $W_m$ of line 23 is obtained from the motor torque (line 27) and the load torque (line 26) to generate an error passed into a transfer function TF2 involving integration with the motor inertia J, as generally known. The speed error of line 34 is passed into a proportional (K1) and integral (K2/S) circuit (TF3) providing on line 35 the torque demand T* necessary to reduce the speed error. In order to ensure that the outputted torque demand is correctly limited and that the integral within TF3 is similarly limited, imposed in relation to both the input of line 34 and the output of line 35, as generally known. The torque demand of line 35 is scaled by a circuit SC2 involving the formula $2R2/3n \psi^{*2}$, where R2 is the rotor resistance, n is the number of pole pairs, and $\psi^*$ the constant flux demand in this instance. The result is (on line 36) the slip frequency Ws. Two transfer functions TF4 and TF5 are used in response to line 36 in order to provide, under polar coordinates, the current vector i on line 38 and the vector angle $\theta$ on line 48, which are converted by a vector current control system VCCS into currents: $i_a = i \cdot \sin(\theta)$; $i_b = i \sin(\theta - 2\pi/3)$ and $i_c = i \cdot \sin(\theta + 2\pi/3)$ for the three phases U, V, W of the motor supply. Transfer function block TF4 involves the function $(1 + W_s^2 T_2^2)^{\frac{1}{2}} \times Y_m$, where T2 is the L2/T2 rotor time constant, with L2 being the rotor inductance, and M the mutual inductance between rotor and stator. Transfer function block TF5 involves the arc tangent $TAN^{-1} \leftarrow (\omega_s T_2)$. The angle $\theta$ is obtainedly, first integrating the signal of lines 36 and 42 to provide on line 43 a demand angle, and by integrating the signal of lines 23 and 40 (which is the actual $W_m$ signal) thereby obtaining by integration $\theta m$. Then, a summer S3 combines the angles of lines 43 and 41 to provide on line 44 a corrective angle for the output (on line 47) from transfer function TF5, via summer S4. All this is generally known, and is provided only to illustrate the prior art.

Figure 4:
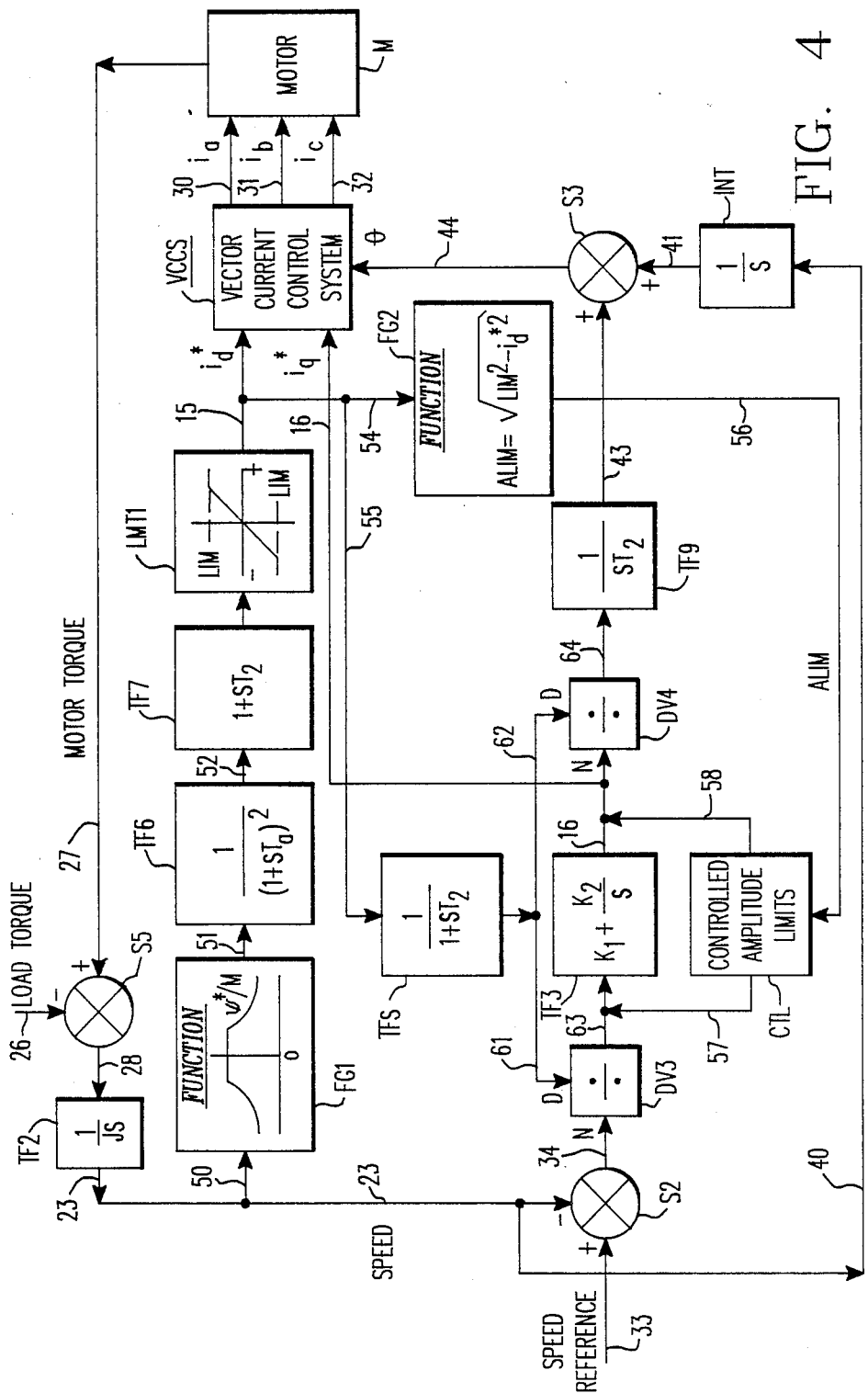
FIG. 4 is a block diagram of the speed/torque control system embodying forced flux level control.

Referring to FIG. 4, a speed regulator system implementing controlled flux-forcing according to the present invention is illustratively shown.

FIG. 4 shows, like in FIG. 3, the generation of a speed error (on line 34), the generation of a speed signal (on line 23) obtained from a motor torque signal (line 27) and a load torque signal (line 26), and the generation of a vector angle $\theta$ (on line 44). However, instead of generating a polar coordinate vector current i (as in line 38 of FIG. 3), direct and quadrature current components $i_d^*$ and $i_q^*$ are generated on lines 15 and 16, like in FIG. 2.

In principle, the torque produced by an induction motor and the magnetic flux level in the machine can both be controlled dynamically by correctly controlling the stator current vector and its instantaneous slip frequency relative to the rotor. FIG. 2 shows the relationships which must be preserved in order for the instantaneous torque demand T*, and the instantaneous flux demand $\psi^*$, to be satisfied. In this diagram, the components $i_d^*$ and $i_q^*$ represent the stator current vector in a reference frame at angle $\theta$ relative to the stator, and $T_2$ is the rotor time constant.

When a motor drive application requires constant flux operation (i.e. $\psi^*$ constant) this control concept can readily be used to configure a closed loop speed regulator system as shown in FIG. 3. In such a case all gain terms are constant and the speed control bandwidth applied to TF3 stays constant at all operating speeds. The motor phase current can be limited by simply placing fixed amplitude limits on the compensated speed error signal, as shown in relation to block TF3.

However, for some applications it is necessary to control the motor flux level dynamically. Under constant horsepower operation, for example, the motor flux must be forced-down while accelerating and forced up again while decelerating, in order to ensure that a prescribed flux level is achieved at each speed. If this is not done, it may not be possible to meet the operating specifications continuously under the available supply voltage. FIG. 2 shows that when $\psi^*$ varies with time, the direct current component $i_d$ must contain terms proportional to both $\psi^*$ and its rate of change.

The speed signal of line 23, by line 50 and function generator FG1, is converted into a flux demand representative signal, the function being $\psi^*/M$ for both directions of rotation. Function generator FG1 defines a speed range for which the flux demand $\psi^*$ is constant. Outside the range on either side thereof, depending upon whether the speed is positive (forward), or negative (reverse), the flux demand is forced down as the speed exceeds what can be called the "base speed" of the motor drive, and conversely is forced back to the constant flux level if the speed is decreasing toward "base speed". The invention comes into play in these two instances: by i on the one hand allowing the direct current component $i_d{}^*$ to provide the necessary flux within the assigned limits ±LIM, and on the other hand by 2) controlling the quadrature component $i_q{}^*$ within limits and within the capability to exert torque controls with the quadrature component after the priority has been given to the direct component. The outputted signal of line 51 is only an ideal value. The latter is converted into an actual value by a transfer function TF6 taking into account the time lag and introducing a time constant Ta through a formula $1/(1+sT_a)^2$. The flux demand $\psi^*$ on line 52 is then passed into a proportional-plus-differential transfer function $(1+sT_2)$ within block TF7. The outputted current signal (on line 53) is only ideal and needs to be maintained within practical limits LIM as shown by the limiter LMT1 of FIG. 4.

According to the present invention where $i_d$ and $i_q$ are variables, each calling for a resultant current required to be held between acceptable limits. It is now proposed to treat the direct component id independently as a variable to be held between own limits ±LIM which match the limits imposed to the resultant current vector, but independently of the resultant current vector, thereby forcing the flux from line 15 to conform the required values within the function of FG1 for the particular speed.

Having established the instantaneous value of $i_d$, the value of $i_d$ is used to instantaneously and continuously calculate which limits can be imposed to the quadrature component $i_q$ so that, while maximizing the use of $i_d$, the resultant current vector, nevertheless, will not exceed its imposed limit. This is achieved from the consideration that the sum of the squares of the direct and quadrature components of current is equal to the square of the resultant vector. Accordingly, the limit to be imposed to the quadrature current ALIM is such that $ALIM = \sqrt{LIM^2 - i_d{}^2}$. In other words, while $i_d$ is allowed to be maximized within the limits ±LIM assigned to the resultant vector, the limit ALIM can be imposed to the quadrature component, thereby never to exceed the limit LIM for the resultant current vector. As shown in FIG. 4, this is achieved with function generator FG2 responsive to the signal of line 15, and line 54, thereby providing (on line 56) the variable limit ±ALIM to be applied to controller CTL applying by lines 57, 58 to the (P +I) controller TF3 of line 63 to line 16, a window of variable width, in contrast to the fixed amplitude limits applied to block TF3 of FIG. 3. The resulting signal is on line 16 the quadrature component $i_q{}^*$ which, with the direct component $i_d$ of line 15, determines the current control signals of lines 30, 31, 32. The resultant vector angle 8 is obtained on line 44. To this effect from line 16 is supplied the numerator of a divider DV4 having the output of a function $1/(1+sT_2)$ defined within a transfer function TF8 (responsive to line 15) as its denominator. An integrator (TF9) embodying a function $1/sT_2$ is used to convert the signal of line 64 outputted by divider DV4, which is a speed signal, into a position (on line 43) angle signal to be added by summer S3 to the actual position angle derived from line 23, via line 40 and integrator INT, and obtained on line 41. Therefore, line 44 (at the output of summer S3) is the frame angle $\theta$ enabling the conversion (by the vector current control system VCCS) of $i_d{}^*$ and $i_q{}^*$ into phase currents $i_a$, $i_b$, $i_c$. In other words, the direct component $i_d$ has been given priority over the quadrature component $i_q$, thereby establishing "flux dominance" in the speed controller. This means that no current is allowed to torque production ($i_q{}^*$ of line 16) until the motor flux has reached the prescribed value for each speed according to function FG1.

Should there be no load torque, there will be a self-limiting effect on $i_d$ since reducing motor torque reduces the derivative term in $i_d$. In practice, $i_d$ should never reach its allowable limits, and the drive will accelerate, or decelerate, at an optimum rate which is compatible with the prescribed flux characteristic (in FG1), the inertia (J), and the set current limit (LIM). When the drive is loaded, the situation is similar except that $i_d$, now, conceivably can be driven into limit by the accelerating, or decelerating, action of a load torque. This would be analogous to a loss of control and the drive being stalled by excessive load torque, which would not occur if the load characteristics had been correctly anticipated.

It is recognized that for certain applications it might be difficult to implement the $(1+sT_2)$ transfer function TF7 required for flux control. In such a case some low-pass filter action will be provided. A filter transfer function H(s) will be chosen to represent an acceptable time lag between the flux demand and the actual flux in the machine. However, thanks to the invention, such time lag can be made much shorter than the $T_2$ time constant which would prevail if no flux forcing was attempted. It will also be chosen to meet a tolerable noise level. Typically where the rotor time constant is $T_2 = 458$ msec, (considering TFG as two cascaded first order lag filters, in the instance of each having a 10 msec time constant), H(s) can be chosen to be two real poles at $s = -100$.

In the proposed control system, the actual motor flux level is calculated from the demanded value of $i_d$ and the resulting signal controls the gain of the speed regulator loop. Since the gain would otherwise vary in proportion to the actual flux, the action of such adaptive control is to increase the loop gain for decreasing flux and vice versa. The regulator is tuned to operate under full flux conditions below base speed. It should, then, have constant small signal bandwidth at all speeds. Should the increased gain associated with low flux increase the noise level propagated from the speed feedback transducer, the path will be adequately filtered.

Figure 5:
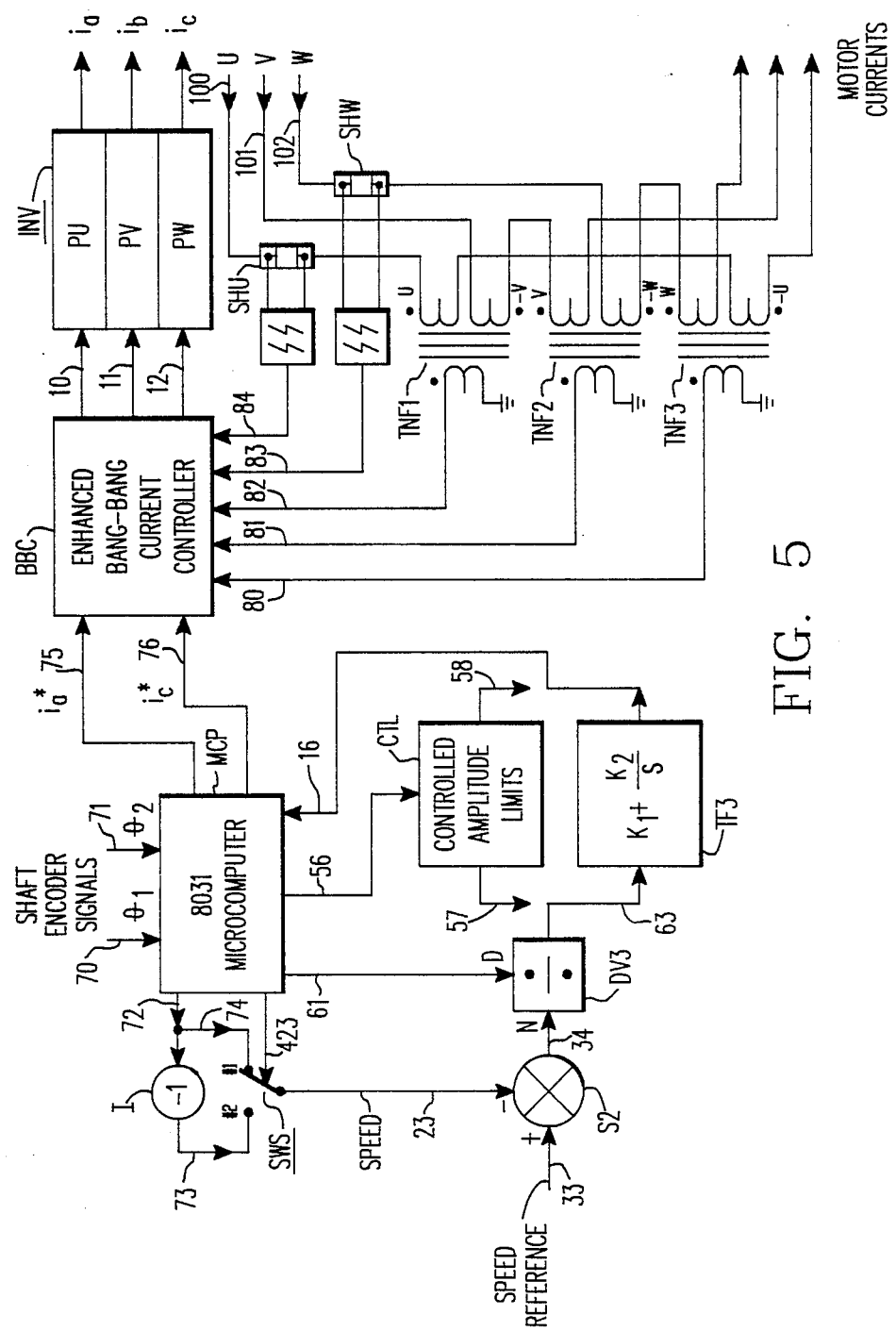
FIG. 5 shows the drive control system which is a preferred implementation in the speed/torque control system of FIG. 4.

Referring to FIG. 5, the drive control system according to the invention is shown to use a computer MCP (in this instance an INTEL microcomputer 8031) for performing many of the functions disclosed in analog form in FIG. 4. Thus, the ALIM function of FG2 is performed by the computer and supplied by line 56 to the controller CTL. The $i_q{}^*$ quadrature component of line 16 is supplied to the computer, the $i_d{}^*$ draft component being generated within the computer. The computer responds on lines 70 and 71 to two shaft encoder signals $\theta 1$ and $\theta 2$, which the computer uses as generally known to provide the signal $\theta$ of line 44 in FIG. 4. The computer generates the actual speed signal on line 72 which, depending upon the sense of rotation (forward, or reverse), by switch SWS, and as controlled by the computer, will cause on line 23 the speed signal to be applied to summer S2, like in FIG. 4. The computer also generates the signals of lines 61 and 56 (like in FIG. 4). Accordingly, are outputted current reference signals $i_a{}^*$ and $i_c{}^*$ on lines 75, 76, respectively. The third phase current signal $i_b{}^*$ being obviously: $-(i_a{}^* + i_b{}^*)$.

According to the main aspect of the invention, and as shown in FIG. 5, a bang-bang current controller BBC is used, in response to the reference signals of lines 75, 76, to apply by lines 10, 11, 12 (like in FIG. 1) control signals for the gating circuits GC1, GC2, GC3 of the respective inverter poles PU, PV and PW.

The bang-bang method of controlling an inverter is generally known. See for instance A. Kernick, D. T. Stechschulte and D. W. Shireman/"Static Inverter With Synchronous Output Waveform Synthesized by Time-Optimal-Response Feedback" in IEEE Transactions IECI Vol. 24, No. 4, Nov. 1977, pages 297-305; also, "Time-Optimal Response Control of Two-Pole Single-Phase Inverter"/M. A. Geyer and A. Kernick/-Power Cond. Spec. Conf. JPL, Pasadena, Calif., Apr. 19, 1971; and, "High Performance Torque-Controlled Induction Motor Drives"/C. A. Schauder, F. M. Choo, M. T. Roberts in IEEE Trans. IA-19, No. 3, May-June 1983. The bang-bang technique used here calls for a measurement of the motor currents where shunts SHU, SHV for two of the phases (U, V) provide on lines 83 and 84 the sensed current signals. The motor currents on lines 100, 101, 102 are passed into three transformers TNF1, TNF2, TNF3 providing in the primary the difference between two consecutive currents. Thus TNF1 receives the difference between $i_a$ of line 100 and $i_b$ of line 101. Transformer TNF1 generates at its secondary the rate of change $d(i_a - i_b)/dt$, mainly on line 82. Similarly, TNF2 provides on line 81 the rate of change $d(i_b - i_c)/dt$, and TNF3 provides on line 80 the rate of change $d(i_c - i_a)/dt$. Circuit BBC generates on lines 10, 11, 12 (like in FIG. 1) control signals for the gating circuits (GC1, GC2, GC3) of the three poles PU, PV, PW of the inverter, respectively.

How the bang-bang current controller BBC, according to the invention, has been provided with enhanced capability will be explained hereinafter by reference to FIGS. 12 and 15. The speed regulator according to the invention will be first described in its best mode of operation by reference to FIGS. 5, 6 and 7.

Figure 6A:
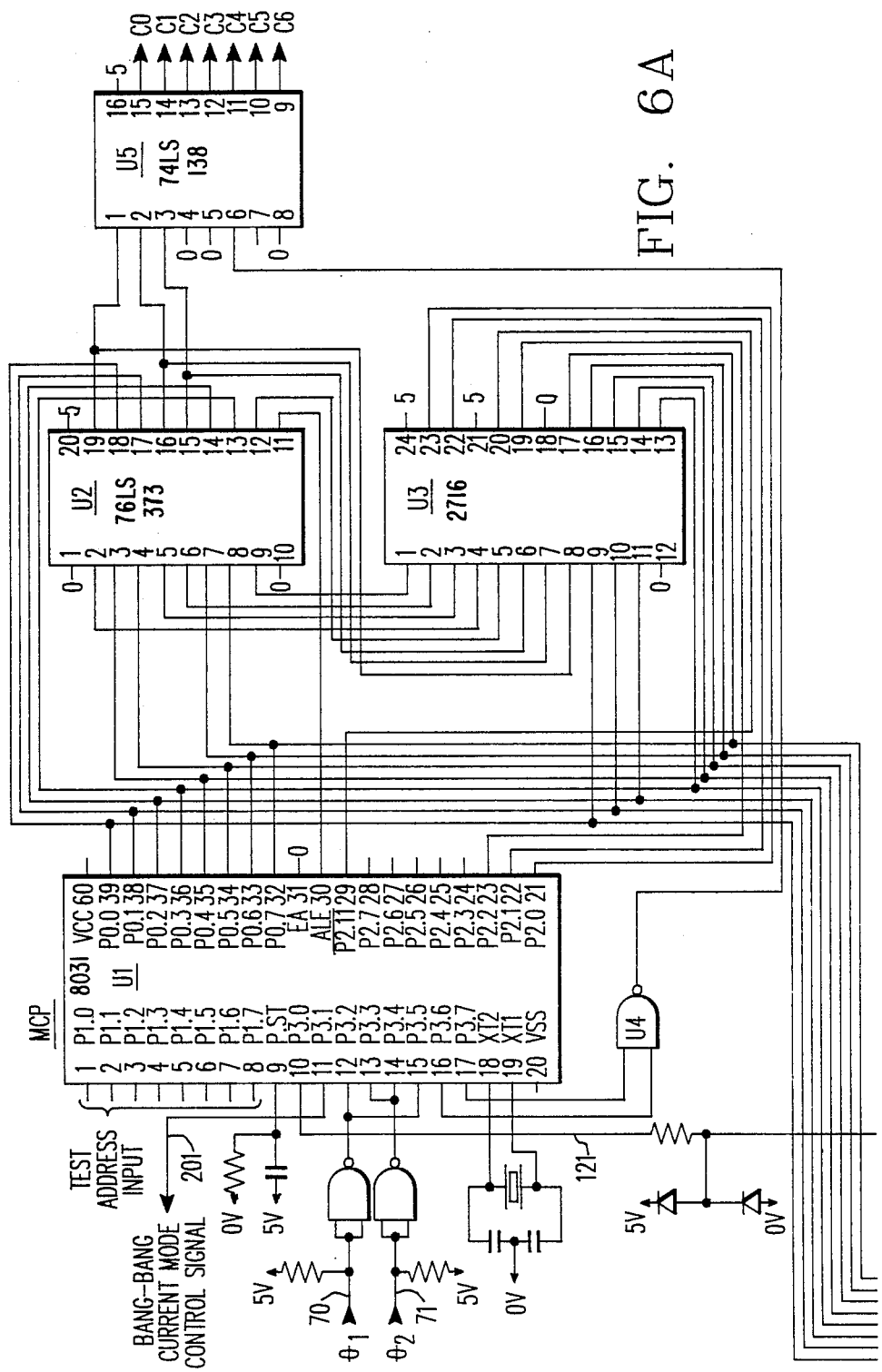
FIGS. 6A and 6B are a hardware representation of the speed regulator in the system of FIG. 5.
Figure 6B:
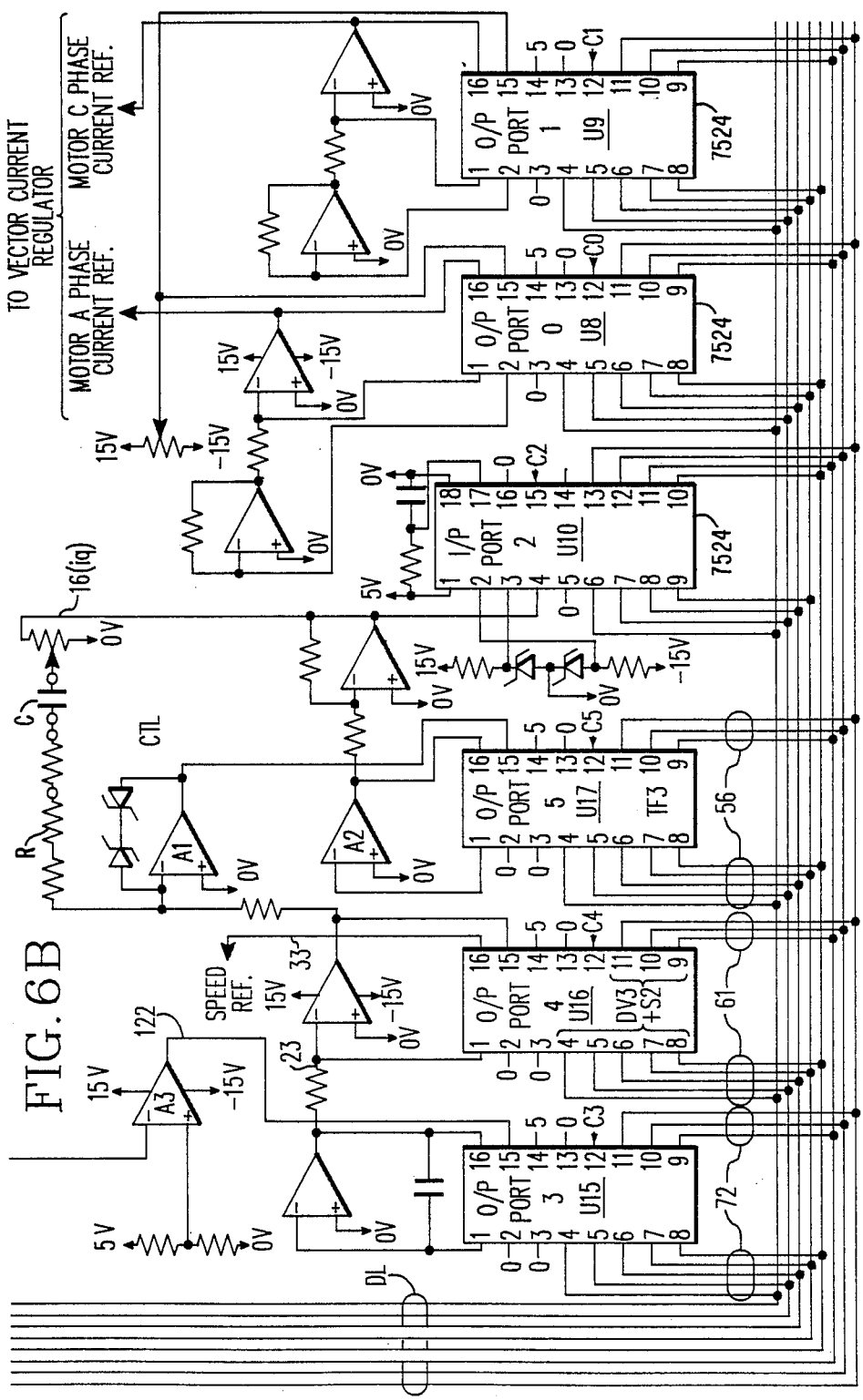

FIGS. 6A and 6B show the computer MCP of FIG. 5 connected by 8-bit data lines (DL) which are interconnected through ports #1 (solid state device U9); #0( U8); #2 (U10); #5 (U17); #4 (U16) and #3 (U15), as seen from right to left in the drawing. The microcomputer MCP is an INTEL 8031. Chips U9, U8, U10, U17, U16 and U15 are of the 7524 type. Associated with the computer are an address latch U2, its decoder U5, and a PROM memory U3.

Ports #0 and #1 output on pins 16, and lines 75 and 76, the current references $i_a^*$ and $i_c^*$, respectively. Port #2 includes an A/D converter outputting, on pin 4 and line 16, the quadrature component signal $i_q^*$. At port #5 are received the 8 bits from the data lines DL relating to line 56 of FIG. 5 (pins 4 to 11 of V17). Chip U17 involves the function TF3. To it are associated amplifiers A1 and A2 which concur in accomplishing the speed regulator gain adjustment and the function of controller CTL.

Port #4 receives the 8-bit lines 61 from the data lines DL (pins 4 to 11 of U16). The functions of summer S2 and divider DV3 are performed by chip U16, in relation to the speed reference of line 33 (received on pin 16) and the actual speed of line 23 (on pin 1).

At port #3, the data lines DL (at 72) provides (pin 4-11) the speed modulus, and the speed polarity is accounted for by lines 121, 122 from the computer (polarity determination at A3) in accordance with pin 10 of solid state device U1 (MCP). The speed feedback signal appears on line 23.

Figure 7:
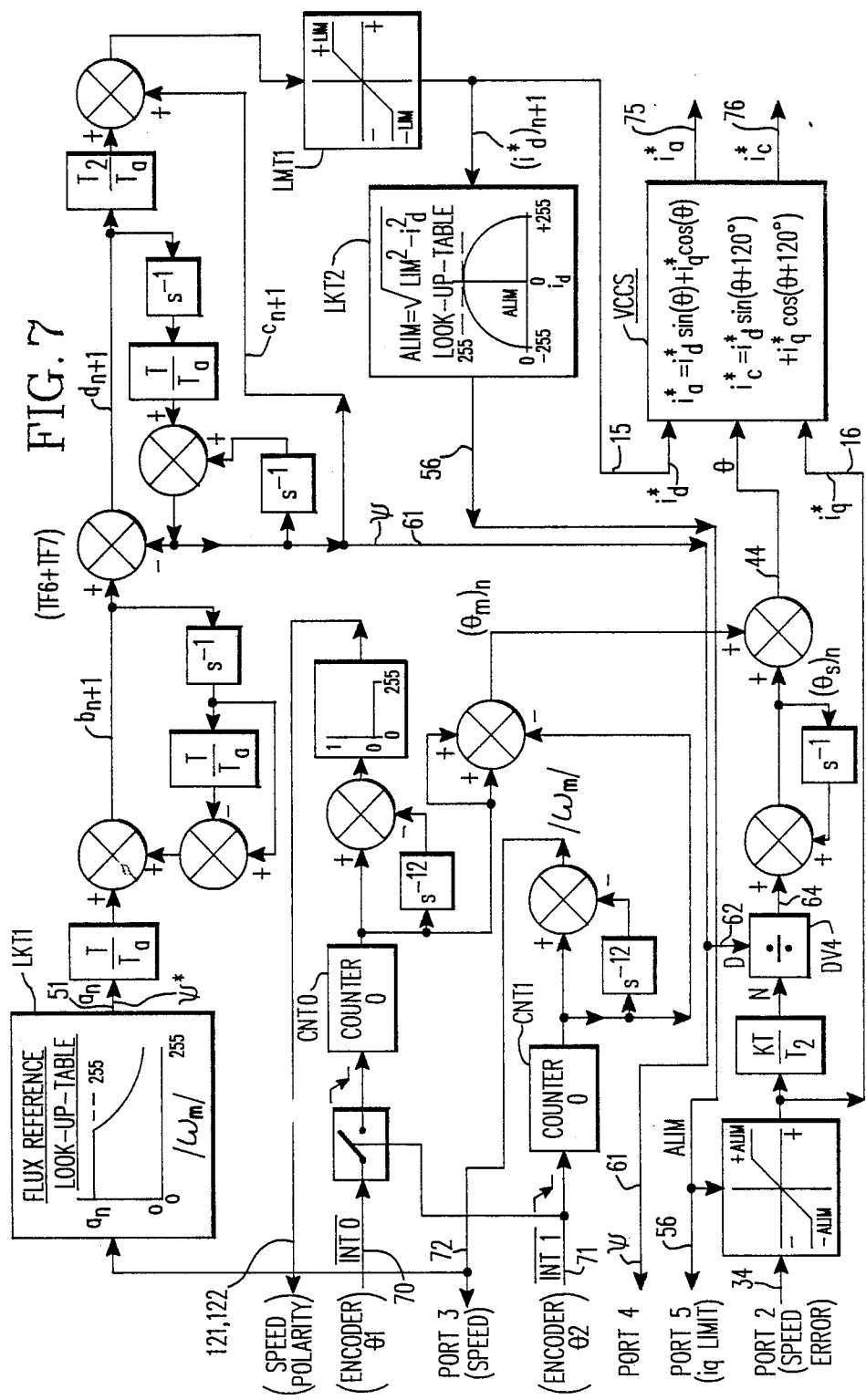
FIG. 7 is a schematic representation of the control software used in the speed/torque control system of FIG. 4.
Figure 8A:
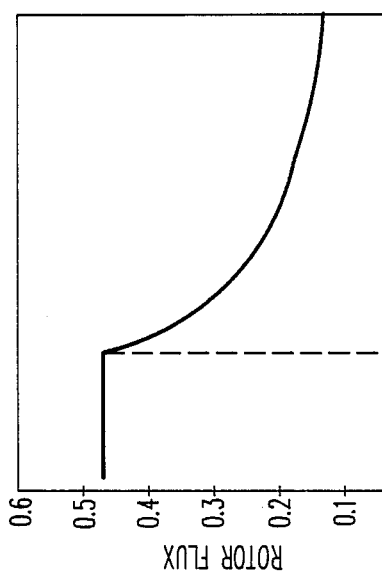
FIGS. 8A-8D are the power, rotor flux, torque/speed and voltage pkph/speed motor drive characteristics, respectively, for steady-state maximum power with speed/torque control system.
Figure 8B:
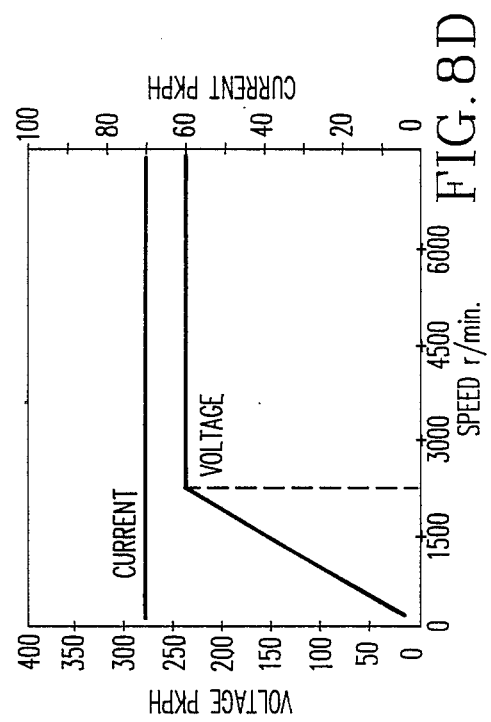
Figure 8C:
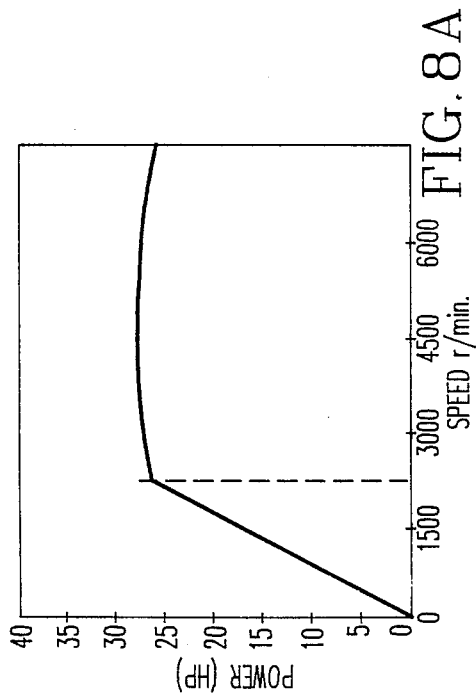
Figure 8D:
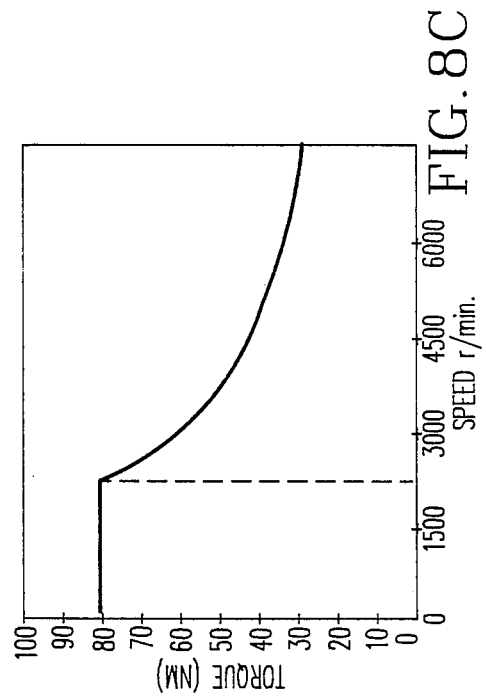

FIG. 7 is a software rendition of FIG. 4 where the lead lines and blocks are matching with their numeral references the corresponding ones of FIG. 4. In addition have been added in block diagram the software implementation of function FG1 with 1) a look-up table LKT1 outputting the flux demand required for the speed of line 72; and 2) symbolic representations of functions TF6 and TF7, leading to the limiter LMT1, then, to the ALIM calculator, the latter using another look-up table LKT2. The derivation of $W_m$ with the encoded values $\theta_1$ and $\theta_2$ is illustrated with counters CNT0 and CNT1.

More generally, FIG. 7 is readily understood in the light of FIG. 4, for the derivation of $i_d^*$ on line 15, $i_q^*$ on line 16, of $\theta$ on line 44, and of $i_a^*$ and $i_c^*$ on lines 75, 76 at the output of the vector current control system VCCS.

In FIG. 7, T represents the sample time (350μs), $T_a$ is the filter time constant (10 μs), K is the number of encoder counts per electrical radian (256/2π), and Q is a preset scaling constant which is the ratio between the maximum current (LIM) and the steady-state value of $i_d$ below base speed. The on-board counters of the 8031 computer simplify the derivation of the shaft position, the speed and the direction of rotation. The speed measurement is essentially done by pulse counting to give an 8-bit representation of the top speed modulus value.

Using a 12-MHz crystal, the 8031 computer performs the algorithm in 350 μs. This time is acceptable although a shorter execution time can be sought. At 240 Hz, which is the envisaged top or brake speed, the system outputs about 12 samples per cycle. Typically, the computer software has been written in ASM51 Assembler language, a way which is efficient in terms of execution time. The program listing is included hereinafter in Appendix A.

FIGS. 8A, 8B, 8C, 8D show curves at steady state (base speed) giving the maximum power characteristics for power (FIG. 8A), rotor flux (FIG. 8B), torque/-speed (FIG. 8C) and voltage/speed (FIG. 8D) in an AC motor drive not using the invention.

Figure 9A:
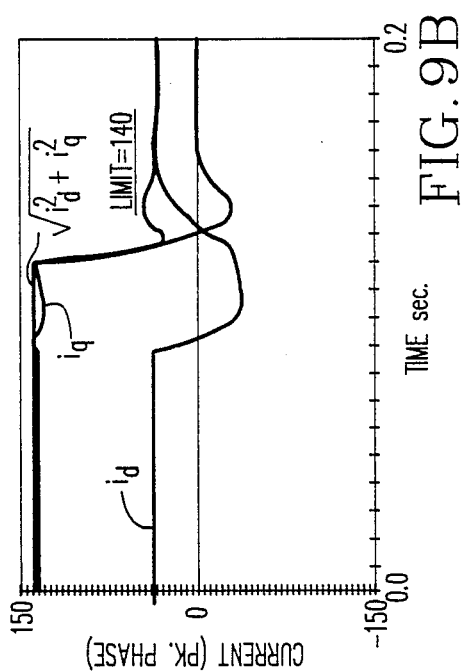
FIGS. 9A-9D are simulated characteristics for the torque, the current, the speed and the voltage, respectively, for an induction motor drive under flux-dominant speed/torque control system, when accelerating through base speed.
Figure 9B:
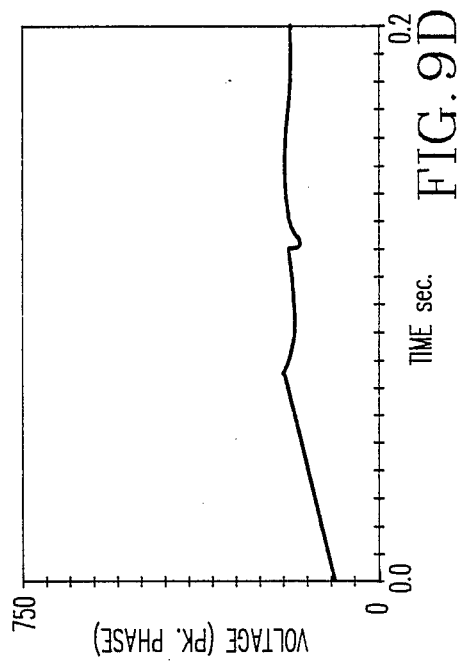
Figure 9C:
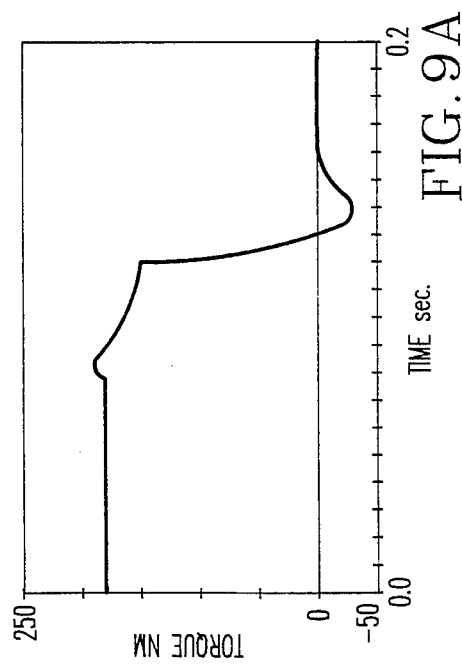
Figure 9D:
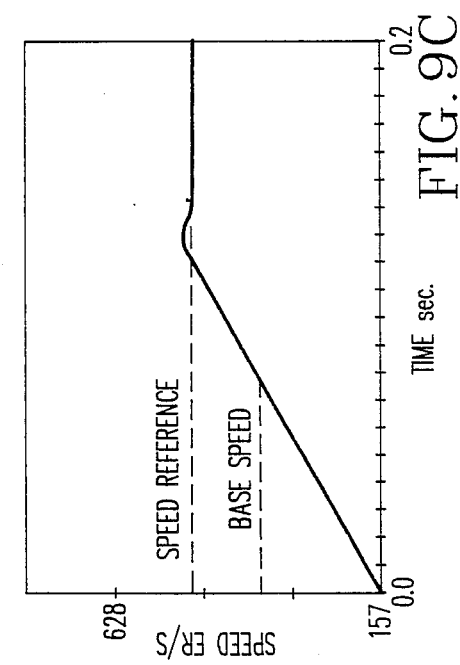
Figure 10A:
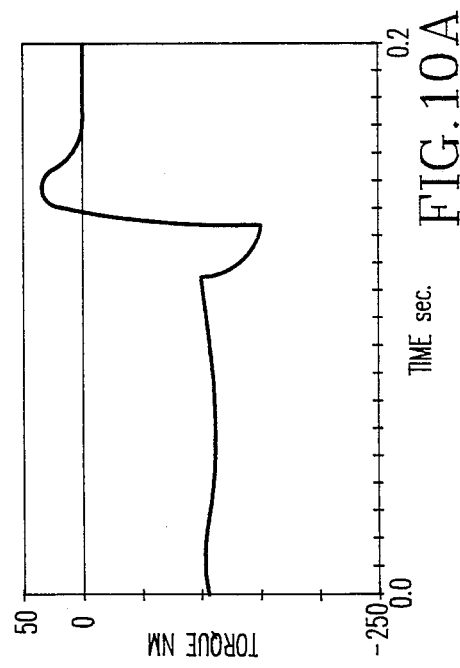
FIGS. 10A-10D are simulated characteristics for the torque, the current, the speed and the voltage, respectively, for an induction motor drive under flux dominant speed/torque control system, when decelerating through base speed.
Figure 10B:
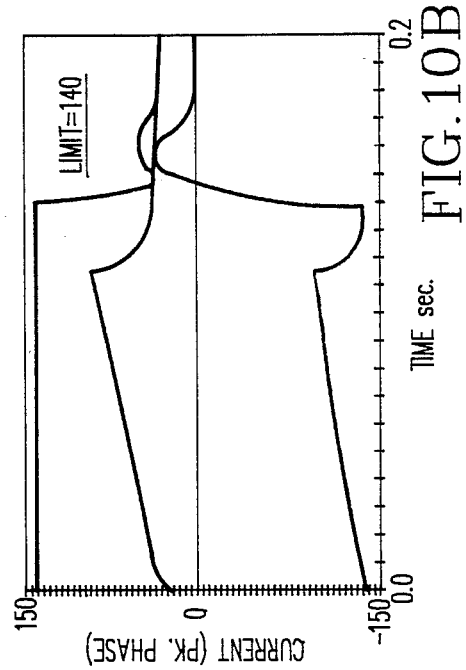
Figure 10C:
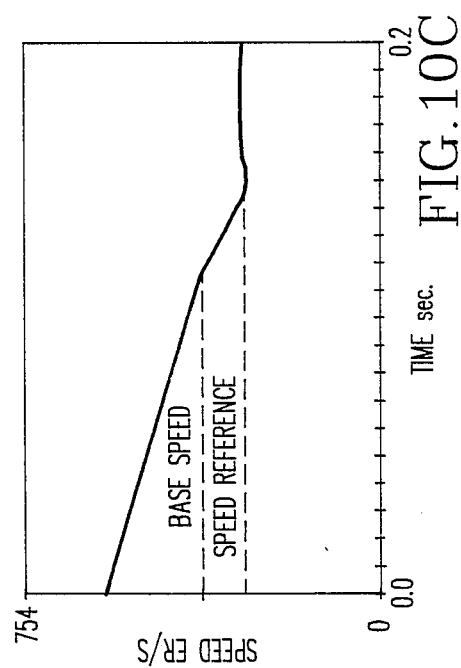
Figure 10D:
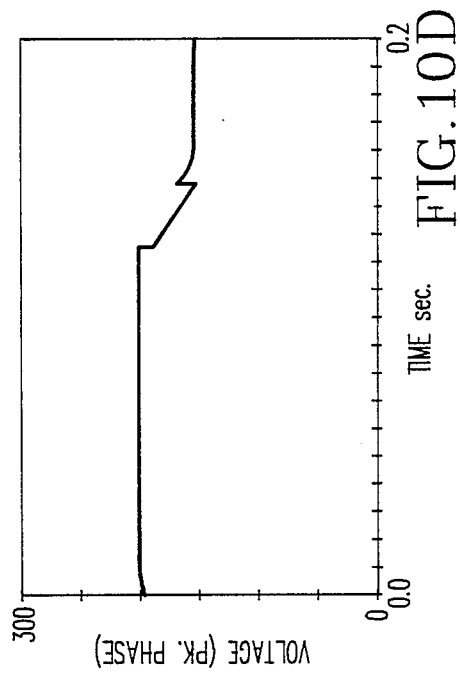

FIGS. 9A-9D show the effect of flux-dominant speed/torque control according to the invention when accelerating through base speed. FIG. 9A gives the torque, FIG. 9B the current, FIG. 9C the speed and FIG. 9D the voltage. FIGS. 10A-10D are like FIGS. 9A-9D when decelerating through base speed.

Figure 11:
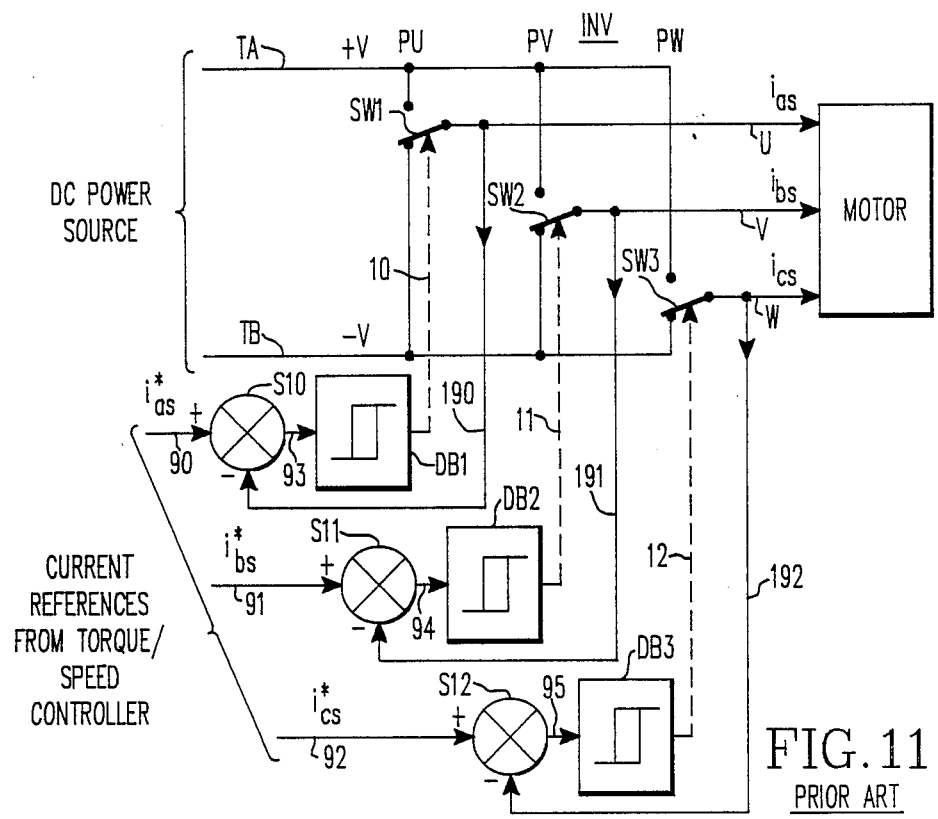
FIG. 11 shows a bang-bang current-control scheme as can be applied for pole-tying current control in the speed/flux control system according to the invention.

FIG. 11 shows a conventional bang-bang current-control system. Between the DC-link line terminals TA, TB and the three phase line inputs U, V, W of the motor is connected an inverter INV with its three poles PU, PV, PW. PWM modulation is obtained by controlling the inverter switches per pole. The inverter switch operation in relation to terminals TA, TB is symbolized by switches SW1, SW2, SW3 for the respective poles, controlled at a certain high frequency in accordance with the control signals of deadband comparators DB1, DB2, DB3 (for the respective switches and poles). The phase currents are sensed from lines 190, 191, 192, and the reference current signals $i_{as}^*$, $i_{bs}^*$, $i_{cs}^*$ are obtained on lines 90, 91, 92, respectively. The errors are derived on lines 93, 94, 95 from subtractors S10, S11, S12, respectively, and applied to DB1, DB2, DB3, respectively.

Figure 12:
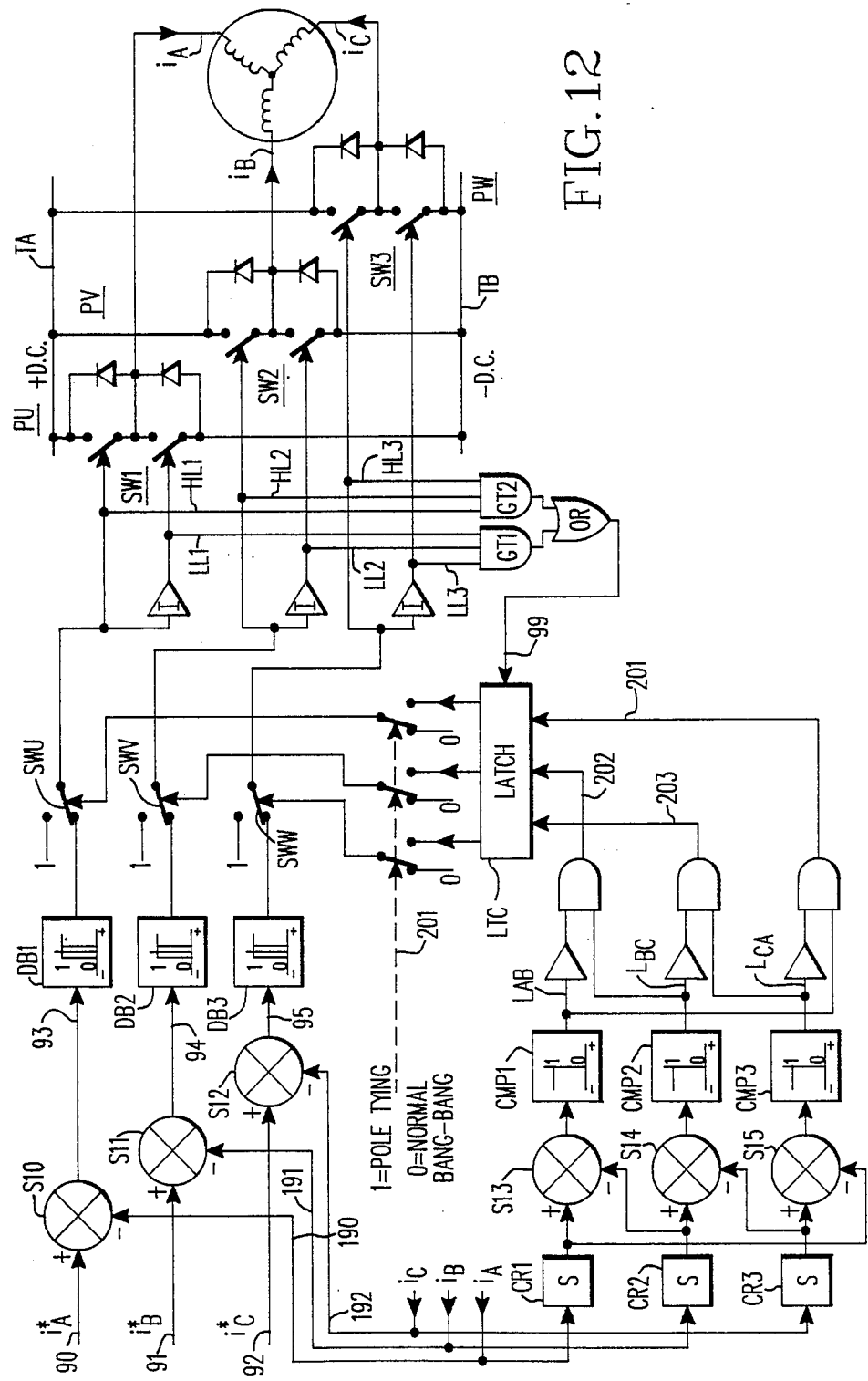
FIG. 12 is a current control apparatus according to the invention which can be applied to the speed/flux control system of FIG. 4.

Referring to FIG. 12, the same technique is shown on the upper part of the Figure. It will be explained now how the conventional bang-bang approach is to be improved and why.

In vector control systems for high performance ac drive control algorithms are used which define the required values of the motor phase currents at all times.

Controlling the motor currents to the reference values with specified accuracy and bandwidth is a significant problem in the implementation of such systems.

The constant voltage DC-link inverter is the preferred static power converter for AC servo drives. The inverter is capable of producing six different non-zero output voltage vectors and two null vectors (the latter when the output lines are shorted). There are a number of schemes for controlling the output current of this type of inverter. One of these which is simple and very effective is the bang-bang system shown in FIG. 11. This controller acts in a non-linear way to keep the motor phase current errors within an acceptable deadband around the target values. The rate at which the inverter poles switch is not constant, but depends on DC link voltage, back-emf of the motor, motor impedance and the size of the error deadband. From a control point of view, this system produces optimum response, but it suffers from a tendency to switch at excessively high frequency on all inverter poles when the motor back-emf is low. This effect may become so severe that in many cases it could cause failure of the inverter hardware.

There are methods of switching this type of inverter on an open-loop basis so as to generate desirable output voltage waveforms. The invention stems from the observation that very high switching frequencies are not "necessary" in order to produce acceptable currents in motors under low back-emf. To this effect, an overriding current control scheme is now proposed which does not suffer from the tendency to switch at high frequency, while still retaining the rapid response quality of the conventional bang-bang method.

The proposed scheme takes advantage of the fact that the motor has only two independent current variables to be controlled via two independent line-to-line voltages. At any time, therefore, two poles of the inverter can be used to actively control the motor current, while the third pole does not switch and simply establishes a reference potential on its associated motor terminal. The selection of such "third pole" is cyclic and occurs by permutation, it being determined by observing motor back-emf.

The proposed current control scheme will be described illustratively by reference to an induction motor load, although the same method could be used for any kind of three-phase load. From the coupled circuit model of the induction motor, the following relationship can be identified:

$$p \cdot i_n = (v_n - e_n)/K \qquad (1)$$

where n=a,b,c designates the motor phases
v=motor phase voltage
i=motor phase current
$e_n$=motor phase back-emf The $e_n$ term in this equation is a function of motor speed, flux linkages and stator current and the constant K is the apparent motor leakage inductance. Under the special condition that the inverter poles all assume the same state, the motor terminals are short-circuited and the rate of change of phase current becomes proportional to the associated motor phase back-emf. Under such special condition, the following equations hold:

$$K e_{ab} = p \cdot (i_b - i_a)$$

$$K e_{bc} = p \cdot (i_c - i_b)$$

$$K e_{ca} = p \cdot (i_a - i_c) \qquad (2)$$

where $e_{ab}$, $e_{bc}$, $e_{ca}$ are the line-to-line motor back-emfs.

The back-emfs defined by Equation 2 could conceivably be evaluated for control purposes, but noise and accuracy problems make this approach unattractive. Instead, it is proposed to measure only the polarity of each emf. Using a simple logic with comparators CMP1, CMP2 and CMP2 of FIG. 12, logic signals LAB, LBC and LCA are derived which effect a comparison between consecutive phase lines, and provide a logical conclusion via an inverting circuit I and AND device. The latter cause lines 201, 202, 203 to assume a distinguishing logical state characterizing the back emf for one pole as opposed to the two others. Thus, the resulting three bits of information of LAB, LBC and LCA make it possible to determine which (201, 202 or 203) phase line of the motor exhibits the highest emf potential. When such phase line is recognized to be at the highest potential, the corresponding switch (SWU, SWV or SWW) is set to the ONE position. For such position, in the instance shown in the drawing by position 1, taken by the particular switch (say SWU) the reference line (96, 97, or 98) is overriden. The subsequent switch (SW1) is accordingly controlled so as to connect the phase line of the motor to the upper rail (positive terminal TA). Then, the following facts apply to each of the other two poles (PV, PW):

(a) Connection to the positive rail TB by the upper arm of the switch (SW2 or SW3) will increase the associated motor line current.

(b) Assuming that the DC rail voltage exceeds the motor line-to-line emfs, connection by the lower arm of the switch to the negative rail (TB) terminal voltage will decrease the associated motor line current.

(c) If the motor emf is low, then the rate of decrease of current will be high and the rate of increase will be low, and vice versa.

This situation is desirable for purposes of control because a change in the pole state is guaranteed to reverse the slope of its output current. A simple bang-bang strategy applied to the two switching-poles under control (SW2, SW3) is sufficient to achieve the required current control.

Figure 13:
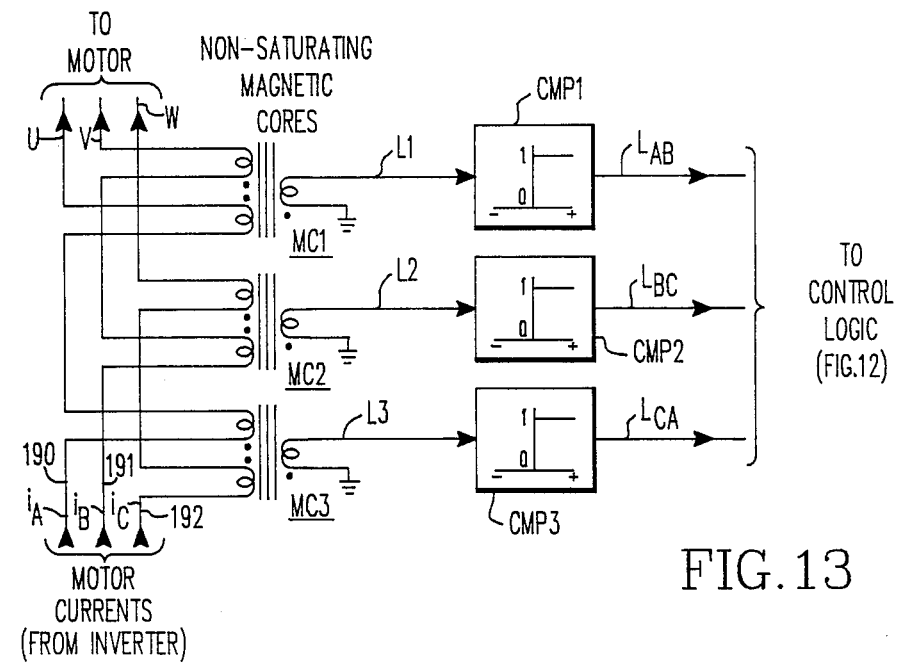
FIG. 13 is a block diagram illustrating the detection of motor emf as can be used in the current control system of FIG. 12.

The three-bit emf code ($L_{ab}$, $LT_{bc}$, $L_{ca}$) used as shown in FIGS. 12 and 13, is applied to a latch LTC to update the reference selection of the tied pole by switch (SWU, SWV or SWW) at a moment when the inverter poles all have the same state (short circuited). This situation occurs recurrently without any other special action being required than to identify it from the inverter switching logic of gates GT1, GT2 and the associated common OR device. Since it can be shown that the emf variables (detected from summers S13, S14, S15 and the associated comparators and current rate circuits CR1, CR2, CR3) change relatively slowly in the case of ac motors, this periodic sampling by latch LTC is adequate to ensure selection of which of the motor phase-lines is to be tied to the positive DC rail TA (in the illustration of FIG. 12) for creating a tied-pole within the cyclic recurrence. It is observed indeed, that by changing the logic of LA, LB, LC and lines 201, 202, 203 which set one of the switches SWU, SWV, SWW, and determine the operation of double-arm switches SW1, SW2, SW3, the motor-phase line could have been chosen to be tied to the negative rail TB, instead.

FIG. 13 illustrates a preferred method for performing the proposed emf detection. In this case magnetic elements MC1, MC2, MC3 are used to achieve the necessary differentiation, subtraction, and isolation.

From the preceding it appears that the operation of the current control system of FIG. 12 is as follows:

The three reference currents $i_a^*$, $i_b^*$, $i_c^*$ derived on lines 90, 91 92 from computer MCP are compared at S10, S11, S12 to the respective motor currents $i_a$, $i_b$, $i_c$ derived on lines 190, 191, 192, thereby obtaining the respective error signals on lines 93, 94 and 95. The error signal is passed through a corresponding deadband comparator (DB1, DB2 or DB3). As opposed to FIG. 11, in FIG. 12 on each input line 96, 97 or 98 the outputted signal (false, or true) is passed to the gating circuits of the thyristors (symbolized by double-arm switches SW1, SW2, SW3) of a corresponding inverter pole (PU, PV or PW), provided the switch (SWU, SWV, SWW) is in a lower position as shown, then, it goes via two lines: one for the upper rail (TA), the other (after inversion of the logic) for the lower rail (TB) of the DC link. Accordingly, for SWU, for instance, upon a "true" logic applied to the upper line 96, the upper part of switch SW1 (namely the corresponding thyristor of pole PU) will connect the motor phase line (U) to the positive rail TA, whereas upon a "false" on the upper line 96, there is a "true" on the lower part going to the lower part of switch SW1, so that pole PU will be connecting phase line U to the negative rail TB. The same is done for poles PV and PW in relation to SWV and SWW.

The states of the upper and lower lines for SW1, SW2 and SW3 are sensed by lines HL1, HL2, HL3 for the upper lines and read by gate GT2, while sensing is by lines LL1, L12, LL3 for the lower lines, the states being sensed and read by gate GT1 in this second instance. An OR device reads either GT1, or GT2, and on line 99 is detected when the three poles are altogether connected to the same rail. When such motor short-circuiting condition exists as detected, line 99 causes latch LTC to latch its inputs from lines 201, 202, 203.

The code logic of lines 201-203 is provided at the output of AND devices combining two consecutive ones of the LAB, LBC and LCA signals from comparators CMP1, CMP2 and CMP3, respectively. As shown earlier in FIG. 5 with respect to transformer TNF1, TNF2 and TNF3, the rate of change for $d(i_a-i_b)dt$, $d(i_b-i_c)dt$ and $d(i_c-i_a)dt$ is derived from, respectively, subtracters S13, S14 and S15, each responsive to the difference between the outputs of two consecutive current rate circuits CR1, CR2, CR3, where $i_a$, $i_b$ and $i_c$ are themselves derived from current lines 190, 191 and 192. As a result, a single logic combination of lines 201, 202, 203 will provide a command signal forcing the arm of a corresponding one of the three switches SWU, SWV and SWW into its upper position (shown as a logic one). Therefore, for such position #1, the signal of line 96, 97 or 98 is overridden and "true" signal will be imposed on the corresponding line, thereby causing the upper arm of SW1, SW2 or SW3 to connect the phase line for that pole to the upper rail or positive terminal (TA). Therefore, that particular pole is "tied" to one rail of the DC-link. In the meantime, the two other poles are normally responding to the two other lines (96, 97, 98) the (DB1, DB2); or (DB2, DB3); or (DB3, DB1) logic, depending upon which pair of poles has been left to operate under normal bang-bang control.

It is also noted that by the line 210 the computer MCP will decide whether the pole-tying mode in to be used, or not. This is done, by switching a switch $\overline{SW}$ ON so as to allow to pass the values of LTC latched by line 99 onto the controlling lines of switches SWU, SWV and SWW whereby two of the switches will allow operation, with two of lines 96, 97, 98, of two of the switches SW1, SW2, SW3 under bang-bang control, while the third switch is being "tied".

FIG. 13 shows the detection of the motor emf in its preferred form. Non-saturating magnetic cores MC1, MC2, MC3 (instead of the transformers TNF1, TNF2, TNF3 of FIG. 5) are used to derive the rate of change $d(i_a-i_b)dt$, $d(i_b-i_c)dt$ and $d(i_c-i_a)dt$ on respective lines L1, L2, L3 which are the input lines of comparators CMP1, CMP2, CMP3 detecting among the three vectors which one is negative. This is translated, as earlier explained, by the logic combination LAB, LBC, LCA at the three outputs.

Figure 14:
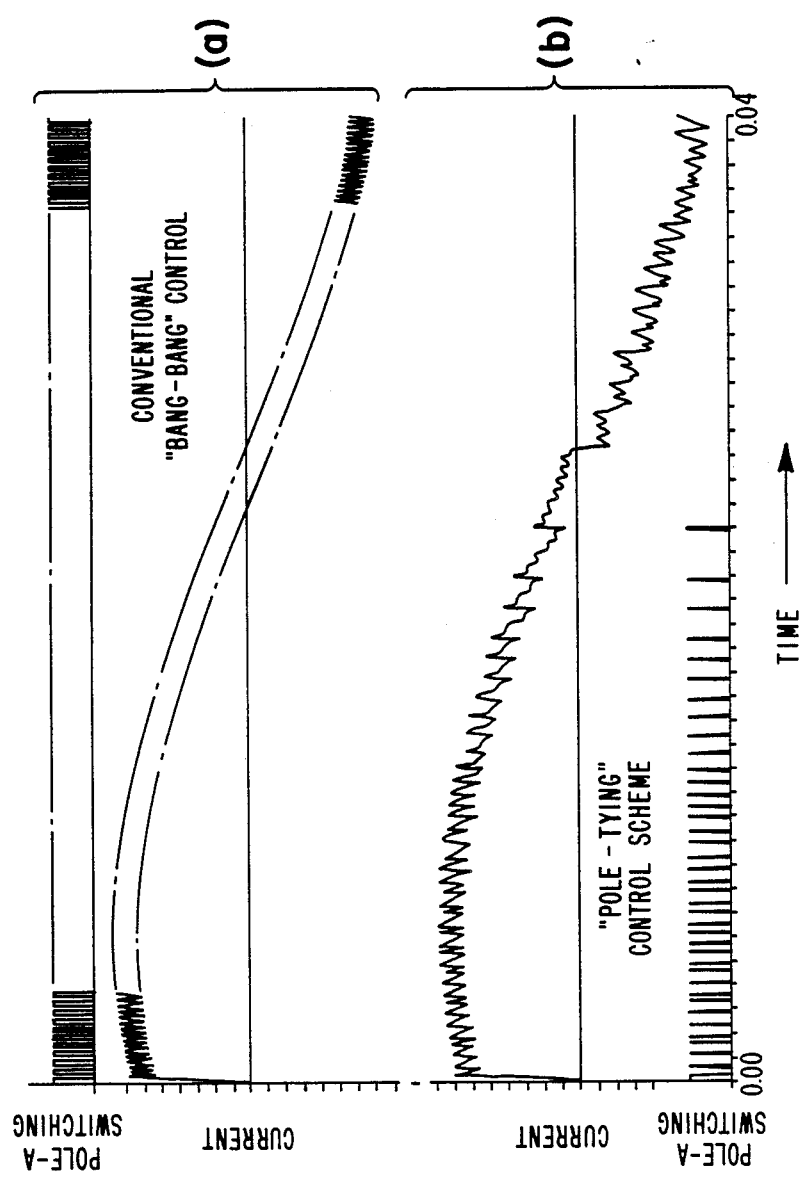
FIG. 14 shows waveforms providing a comparison between the prior art bang-bang control technique of FIG. 11 and the pole-tying scheme used in a bang-bang control system as shown in FIG. 12.

FIG. 14 is showing with curve (c) the lower frequency of bang-bang control achieved under the pole-tying control scheme according to the invention, as opposed to the high frequency of switching exhibited by curve (b) when the conventional bang-bang technique is used. Curve (a) indicates the pole switching frequency.

Figure 15A:
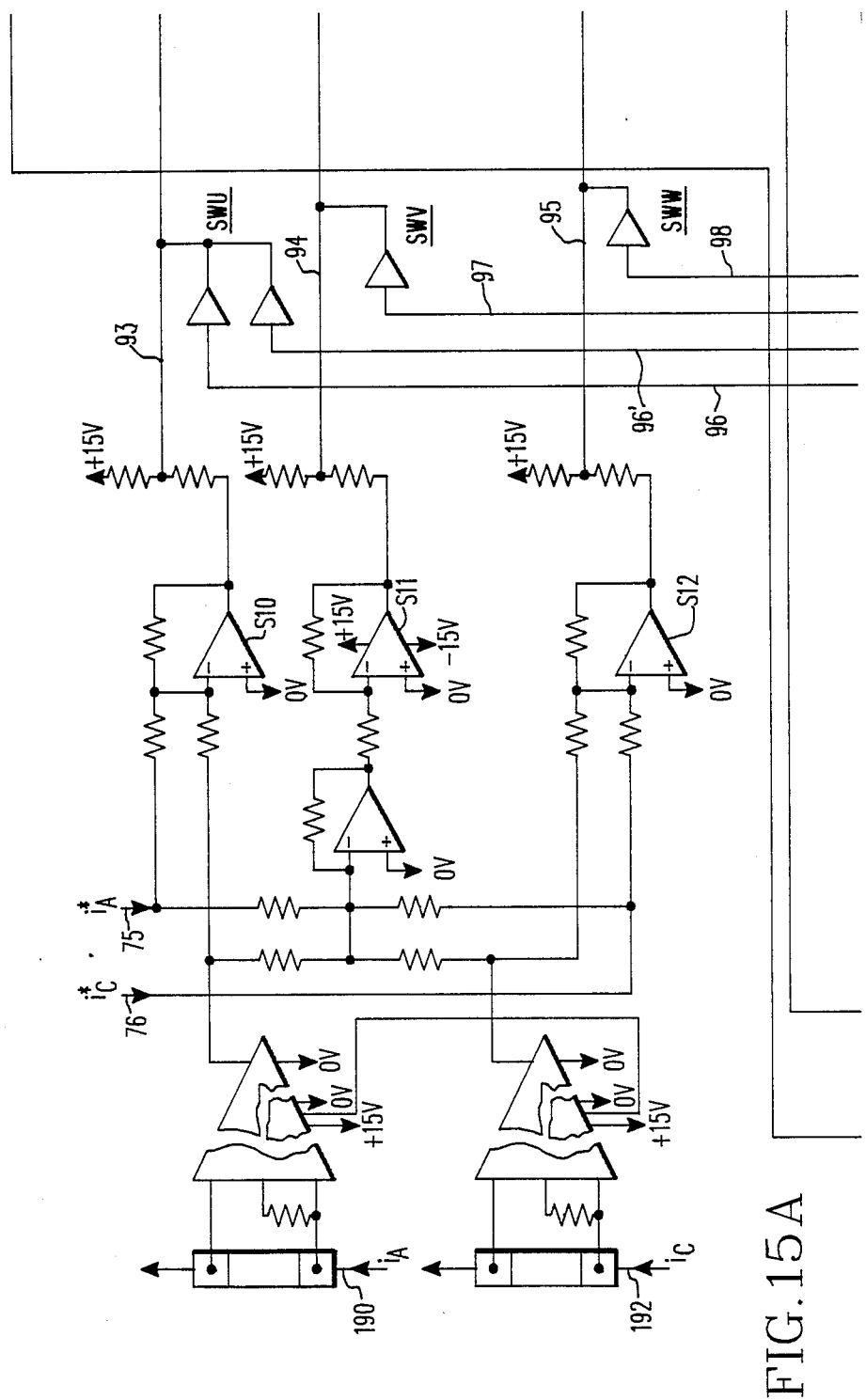
FIG. 15 is a hardware implementation of the current regulator of FIG. 12.
Figure 15B:
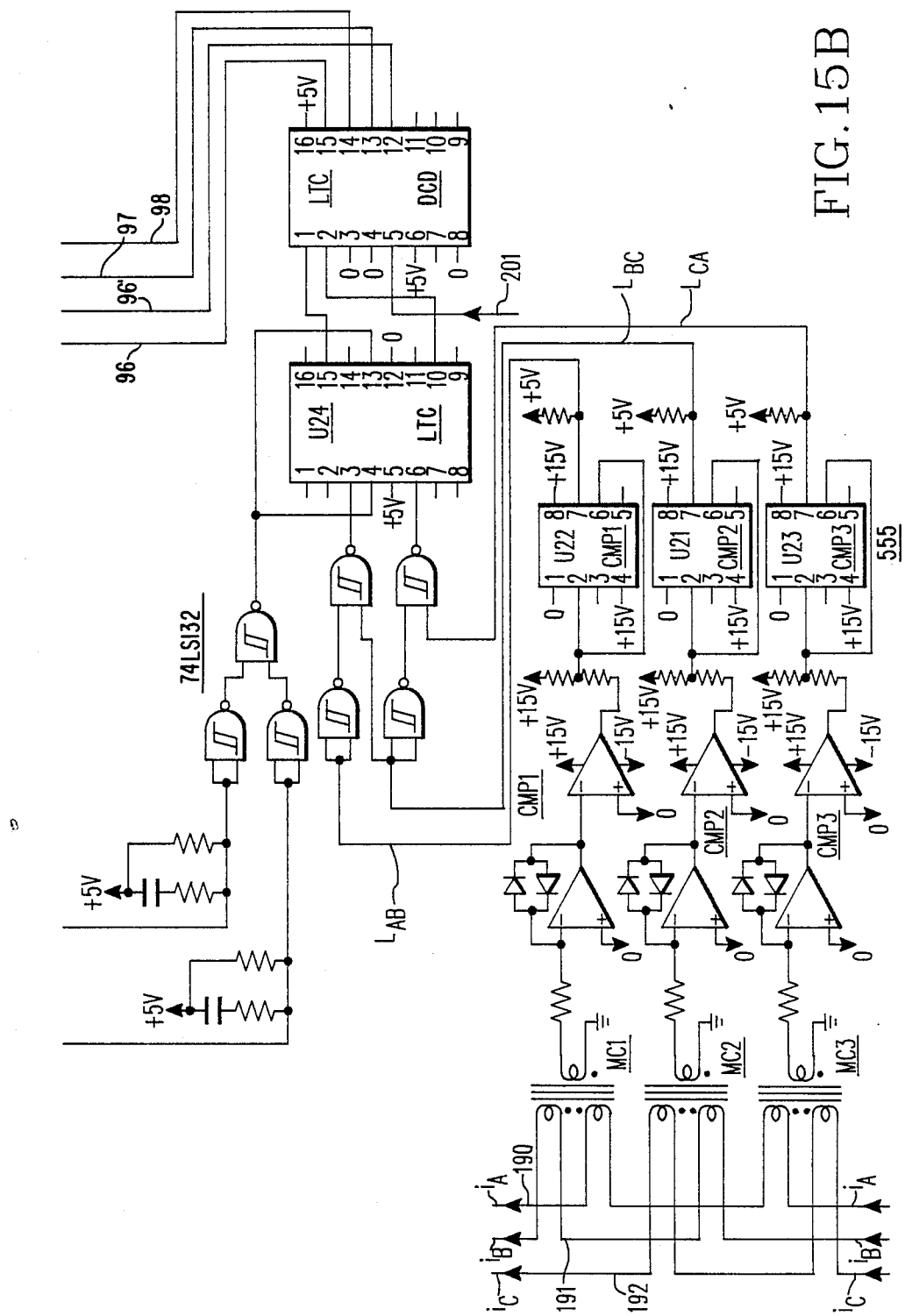
Figure 15C:
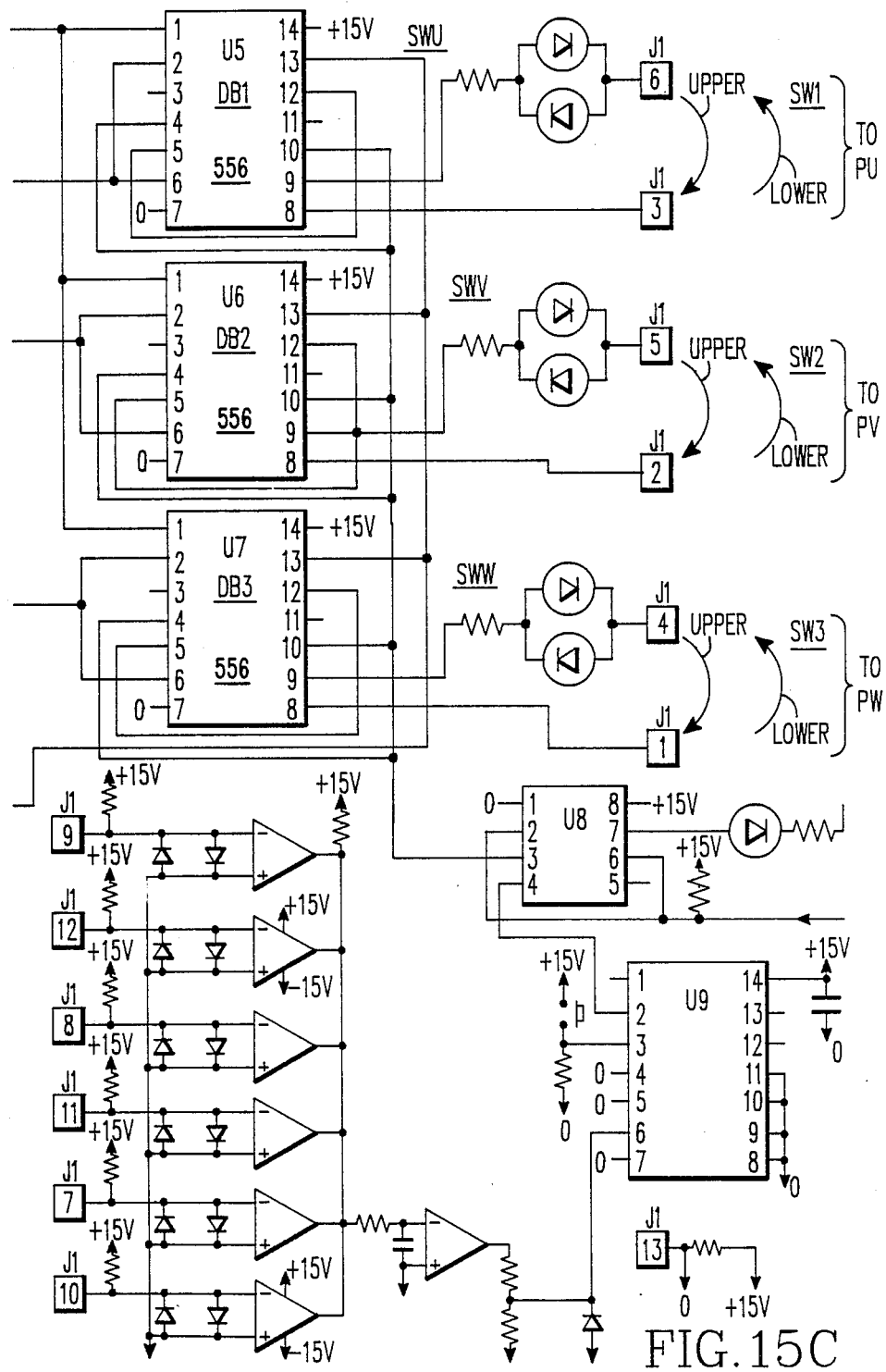

Referring to FIG. 15, a hardware implementation of the circuit of FIG. 12 is illustratively given. Using the same notation as in FIG. 12, the components shown are so identified as to match the blocks and lines of FIG. 12 for the same functions and signals.

To summarize, first a torque/flux control system for an induction motor drive has been described in which when the speed goes out of range or returns to the normal range of operation, the resultant vector current in the motor is limited by establishing the priority of flux-demand over torque-demand. As shown by a curve characterizing the function of FG1 in FIG. 4, as long as the speed remains in the normal range, the flux demand is held constant. The invention comes into effect for the zones outside the range (for positive and negative speed respectively). As illustrated, the flux is forced down from the normal constant level, or brought back to it. In so doing $i_d^*$ is allowed (line 15) to carry such flux-forcing effect until the limit LIM imposed by limiter (LMT1). Thus, the flux is forced down when the speed (for one polarity) goes up, and is forced-up when the speed decreases, as seen relative to the flat portion under normal or base speed operation within FG1 of FIG. 4. Such "flux-forcing" action influences the flux. Therefore, in the machine (by line 23) the actual torque is converted into speed (TF2) and an additional compensating torque is supplied by line 16 ($i_q^*$). If the speed is too low, there will be a positive torque demand, if the speed is too high there will be a negative torque demand. However, a limit ALIM is imposed on that torque as explained earlier by reference to lines 5, 6, controller CTL and transfer function TF3.

In other words, the actual speed (line 23) dictates the value of the flux, subject to flux constraints as specified within FG1.

Secondly, a pole-tying current control apparatus has also been described, illustrated with the speed/flux control system and implemented for a bang-bang controlled system. Instead of using conventionally the bang-bang method, the invention calls for a control scheme by which each pole of the inverter is in turn tied to the rails, while the two other poles respond to normal bang-bang control.

In the proposed current control scheme, each pole of the inverter is in turn typically idle under the tied-up upper rail for 120 degrees of the fundamental output cycle and it thereafter switches normally for 240 degrees. When the motor back-emf is low, a pole will typically switch to the high state momentarily, causing the current to rapidly cross the error deadband, then it will remain in the low state for a substantial duration while the error slowly returns, governed mainly by the natural decay time constant of the load. The induction motor exhibits this effect particularly strongly since the natural roots of the motor have long time constants at very low speeds, i.e., when the emf is low. The average switching frequency is, thus, dramatically reduced in comparison with a conventional bang-bang controller.

Since the current control scheme only holds two of the motor currents within their target deadbands at any time, it follows that the third motor current can develop an error which may be twice the size of the set deadband, but this can be taken into account by choosing the size of the deadband.

When the motor emf is low, the motor short circuit condition used to sample the back emf occurs frequently and there are more than enough samples of emf polarity for the system to function correctly. This situation changes as the motor speed increases and the back-emf rises to a point where it nearly equals the DC-link voltage in magnitude. In order to avoid large uncontrolled currents, the inverter may be forced to assume the short-circuit state periodically, thereby avoiding this situation. Another approach is to allow the scheme to revert to conventional bang-bang control whenever the back emf has risen sufficiently (i.e. above some specified motor speed), since the conventional bang-bang allows safe operation all the way to the voltage limits with no excessive switching frequency in this region. Control by line 201 allows such mode adjustment.

For simplicity, the scheme has been described using only the positive rail TA of the DC link as the rail to tie the third pole to. This approach could, in some cases, lead to practical difficulties. For example, at very low output frequencies the lower switch in the reference pole might carry uninterrupted load current for long periods of time. If the semiconductor switch has high conduction losses, this could be thermally undesirable and it would lead to a lower rating for the equipment. This problem is eliminated by alternately using the positive and negative rails as the reference potentials. In the same way that the most negative emf potential is deduced from the three bits of emf information of logic lines LAB, LBC and LCA the most positive terminal can also be selected and the pole so identified will be tied to the positive rail TA of the inverter. Simple circuitry can be arranged to make the system oscillate between the selection of the positive and the selection of the negative rail as a reference potential.

Accordingly, the pole-tying current control apparatus according to the invention in its second aspect is based on:

(a) The ideal of using two of the inverter poles to control current while the third pole establishes a reference potential on the motor;

(b) A method of observing motor back-emf in order to deduce which pole should establish the reference; and (c) The incorporation of the two previous points (a) and (b) into a bang-bang current controller with consequential benefits.

APPENDIX A
COMPUTER PROGRAM LISTINGS

MCS-51 MACRO ASSEMBLER    SPIN

ISIS-II MCS-51 MACRO ASSEMBLER V2.1
OBJECT MODULE PLACED IN :F1:SPIN.OBJ
ASSEMBLER INVOKED BY:   ASM51 :F1:SPIN.ASM

```
LOC  OBJ        LINE      SOURCE

1        ;VERSION T(11/6/84) INCLUDE TEST PORT 6
                 2        ;VERSION S (9/26/84)
                 3        ;SPEED REGULATOR CONTROL PROGRAM FOR A
                 4        ;HIGH SPEED HIGH PERFORMANCE INDUCTION
                 5        ;MOTOR DRIVE.
                 6        ;*********************************
                 7        ;DEFINE PROGRAM CONSTANTS
003C             8        X1 EQU 03CH ; POINTER TO TOP OF COUNTER
                 9                    ; STORAGE BLOCK FOR SPEED
                10                    ; MEASUREMENT. (+1)
00B4            11        X2 EQU 180  ; CONSTANT FOR TESTING SPEED
                12                    ; THRESHOLD
002A            13        X3 EQU 42   ; (T2/TA) RATIO
0008            14        X4 EQU 8    ; (DT/TA)*(2**8).
0080            15        X5 EQU 128  ; SCALING FRACTION (1/Q)*(2**8)
                16        ;*********************************
                17        ;INITIALIZATION ROUTINES ARE LOCATED AT
                18        ;795H AND ABOVE
0795            19        ORG 795H
                20        ;START INITIALIZATION PROCEDURE
```

```
                             4,962,339
                17                                      18
                           21   ;
0795 75895D                22   LB1:  MOV TMOD,#05DH   ;TIMER 0= 16 BIT CNTR
                           23                          ;              GATE=1
                           24                          ;TIMER 1= 16 BIT CNTR
                           25                          ;              GATE=0
0798 758850                26         MOV TCON,#050H   ;TR1=TR0=1
079B D2D3                  27         SETB PSW.3       ;SELECT RB1.
079D 7930                  28         MOV R1,#030H     ;INITIALIZE COUNT
                           29                          ;STORAGE POINTER.
079F 751906                30         MOV 19H,#6       ;TEST PORT POINTER
                           31                          ;IN R1 BANK 3.
07A2 020003                32         LJMP LB11        ;START MAIN PROG.LOOP
                           33   ;**************************************
0000                       34         ORG 0
0000 020795                35         LJMP LB1    ;ENTRY POINT JUMP
                           36   ;**************************************
                           37   ;**************************************
                           38   ;PROCEDURE FOR SPEED MEASUREMENT BY PULSE
                           39   ;COUNTING.TL1 COUNTS ENCODER PULSES.
                           40   ;R1(BANK 1) POINTS TO 1 OF 12 STORAGE
                           41   ;LOCATIONS, ONE FOR EACH OF THE LAST
                           42   ;12 COUNT VALUES. ROUTINE TAKES THE
                           43   ;DIFFERENCE BETWEEN THE PRESENT COUNT AND
                           44   ;THE 11TH PRECEDING COUNT.
0003 75D008                45   LB11: MOV PSW,#08   ;SELECT REGISTER BANK 1
                           46   ;**************************************
                           47   ;FIRST ESTABLISH THE SPEED POLARITY AND
                           48   ;SET P3.0 ACCORDINGLY.NOTE: LOCS. 26H AND
                           49   ;27H CONTAIN THE LAST TWO SAMPLES OF TL0
                           50   ;**************************************
0006 C3                    51         CLR C
0007 E526                  52         MOV A,26H
0009 9527                  53         SUBB A,27H
000B C3                    54         CLR C
000C 9401                  55         SUBB A,#1
000E 92B0                  56         MOV P3.0,C   ;P3.0 IS NOW SET TO SPEED
                           57                      ;POLARITY
                           58                      ;(HIGH IF 26H=27H, ELSE LOW)
                           59   ;**************************************
0010 E58B                  60         MOV A,TL1    ;GET PRESENT COUNT
0012 F7                    61         MOV @R1,A    ;ENTER INTO STORAGE BLOCK
0013 09                    62         INC R1       ;INCREMENT POINTER
0014 B93C0A                63         CJNE R1,#X1,LB20 ;JUMP IF NO PNTR OVFLOW
0017 7930                  64         MOV R1,#30H  ;RESET POINTER TO 30H
0019 852627                65         MOV 27H,26H  ;UPDATE THE SAMPLES OF TL0
                           66                      ;FOR POLARITY CALC
001C 858A26                67         MOV 26H,TL0  ;26H CONTAINS NEW SAMPLE,
                           68                      ;27H CONTAINS PREVIOUS ONE.
001F 8007                  69         SJMP LB21
0021 00                    70   LB20: NOP
0022 00                    71         NOP
0023 00                    72         NOP
0024 00                    73         NOP
0025 00                    74         NOP
0026 8000                  75         SJMP LB21
0028 C3                    76   LB21: CLR C
0029 97                    77         SUBB A,@R1   ;SUBTRACT 11TH PREVIOUS FROM
                           78                      ;PRESENT COUNT.
                           79                      ;A=SPEED(0-255 WITH POSS.OVFLOW)
                           80   ;**************************************
                           81   ;OUTPUT SPEED TO PORT 3
02A 7803                   82         MOV R0,#3
002C F3                    83         MOVX @R0,A
                           84   ;**************************************
                           85   ;
                           86   ;PROCEED TO LOOKUP FLUX REFERENCE
002D 75D000                87   LB2:  MOV PSW,#00H ;SELECT REGISTER BANK 0
0030 758302                88         MOV DPH,#02
0033 F582                  89         MOV DPL,A
                           90   ;**************************************
                           91   ;SET P3.1 IF SPEED GREATER THAN 75 DECIMAL
0035 24B4                  92         ADD A,#X2
0037 92B1                  93         MOV P3.1,C
                           94   ;**************************************
0039 E4                    95         CLR A        ;POINT TO ENTRY IN THE FLUX
                           96                      ;REF TABLE (200-2FF)
```

```
003A 93          97        MOVC A,@A+DPTR ;A=FLREF(0-FF)     ( = A(N) )
                 98        ;**************************************
                 99        ;
                 100       ;
                 101       ;**************************************
                 102       ;START THE PROCEDURE FOR CALCULATING THE D-AXIS
                 103       ;CURRENT REFERENCE FROM THE VALUE OF FLREF
                 104       ;( = A(N) ) HELD IN THE ACCUMULATOR
                 105       ;NOTE: A(N) = 0-FF
                 106       ;       R6,R7 = C(N+1)
                 107       ;       R4,R5 = B(N)
                 108       ;**************************************
003B 75F008      109       MOV B,#X4         ;LOAD B WITH VALUE CORRESPONDING
                 110                         ;TO (DT/TA)*(2**8)
003E C3          111       CLR C
003F 9C          112       SUBB A,R4         ;ACC=INT(A(N) - B(N))
0040 500C        113       JNC LB13          ;JUMP IF POS PROCEED FOR NEGATIVE
0042 F4          114       CPL A
0043 04          115       INC A
0044 A4          116       MUL AB
0045 CD          117       XCH A,R5
0046 9D          118       SUBB A,R5
0047 FD          119       MOV R5,A
0048 EC          120       MOV A,R4
0049 95F0        121       SUBB A,B
004B FC          122       MOV R4,A
004C 800C        123       SJMP LB14         ;R4,R5= B(N+1)
                 124       ;          =((DT/TA)*(A(N)-B(N)))+B(N)
004E 00          125       LB13: NOP
004F 00          126       NOP
0050 A4          127       MUL AB
0051 CD          128       XCH A,R5
0052 2D          129       ADD A,R5
0053 FD          130       MOV R5,A
0054 EC          131       MOV A,R4
0055 35F0        132       ADDC A,B
0057 FC          133       MOV R4,A
0058 8000        134       SJMP LB14         ;R4,R5 = B(N+1)
                 135       ;          = ((DT/TA)*(A(N)-B(N)))+B(N)
                 136       ;
                 137       ;NOTE:R4,R5=B(N+1) WGHT FACTOR (2**-8)  POSITIVE
                 138       ;     R6,R7=C(N+1)                 DITTO    DITTO
                 139       ;
005A C3          140       LB14: CLR C
005B ED          141       MOV A,R5
005C 9F          142       SUBB A,R7
005D F9          143       MOV R1,A
005E EC          144       MOV A,R4
005F 9E          145       SUBB A,R6
0060 F8          146       MOV R0,A          ;R0,R1=D(N+1), WT=(2**-8) , POS/NEG
0061 9207        147       MOV 20H.7,C       ;SAVE SIGN OF THIS RESULT IN 20H.7
0063 9206        148       MOV 20H.6,C       ;DUPLICATE THE SIGN IN 20H.6
0065 75F02A      149       MOV B,#X3         ;LOAD B WITH T2/TA VALUE
0068 5035        150       JNC LB5           ;JUMP FOR POS PROCEED FOR NEGATIVE
006A E9          151       MOV A,R1
006B F4          152       CPL A
006C 2401        153       ADD A,#1
006E F9          154       MOV R1,A
006F E8          155       MOV A,R0
0070 F4          156       CPL A
0071 3400        157       ADDC A,#0
0073 F8          158       MOV R0,A          ;R0,R1=MOD(D(N+1)), WT=(2**-8)
                 159                         ;SIGN IN 20H.6
0074 E9          160       MOV A,R1
0075 A4          161       MUL AB
0076 ABF0        162       MOV R3,B          ;SAVE MSBYTE IN R3 DISCARD LSBYTE
0078 E8          163       MOV A,R0
0079 75F02A      164       MOV B,#X3
007C A4          165       MUL AB
007D 2B          166       ADD A,R3
007E C5F0        167       XCH A,B
0080 3400        168       ADDC A,#0
0082 C5F0        169       XCH A,B           ;B,A = (T2/TA)*MOD(D(N+1)),WT = 1
                 170                         ;SIGN IN 20H.7
0084 C3          171       CLR C
```

```
0085 9E          172      SUBB A,R6
0086 FB          173      MOV R3,A
0087 E5F0        174      MOV A,B
0089 9400        175      SUBB A,#0
008B 4008        176      JC LB12         ;JMP IF OPER. PRODUCES SIGN CHANGE
008D 00          177      NOP
008E 00          178      NOP
008F 00          179      NOP
0090 00          180      NOP
0091 00          181      NOP
0092 FA          182      MOV R2,A        ;R2,R3 = (T2/TA)*MOD(D(N+1))-C(N+1
                 183                      ;WT = 1 , SGN IN 20H.7
0093 8033        184      SJMP LB6
0095 EB          185 LB12: MOV A,R3       ;RETRIEVE THE LSBYTE
0096 F4          186      CPL A
0097 04          187      INC A           ;CHANGE THE SIGN
0098 FB          188      MOV R3,A        ;REPLACE THE NEW VALUE
0099 C207        189      CLR 20H.7       ;SET THE SIGN FLAG TO POSITIVE
009B 7A00        190      MOV R2,#0       ;SET MSBYTE TO ZERO
009D 8029        191      SJMP LB6
009E 00          192 LB5: NOP
00A0 00          193      NOP
00A1 00          194      NOP
00A2 00          195      NOP
00A3 00          196      NOP
00A4 00          197      NOP
00A5 00          198      NOP
00A6 00          199      NOP
00A7 00          200      NOP
00A8 00          201      NOP
00A9 00          202      NOP
00AA 00          203      NOP
00AB 00          204      NOP
00AC 00          205      NOP
00AD 00          206      NOP
00AE 00          207      NOP
00AF E9          208      MOV A,R1
00B0 A4          209      MUL AB
00B1 ABF0        210      MOV R3,B        ;SAVE MSBYTE IN R3 DISCARD LSBYTE
00B3 E8          211      MOV A,R0
00B4 75F02A      212      MOV B,#X3
00B7 A4          213      MUL AB
00B8 2B          214      ADD A,R3
00B9 C5F0        215      XCH A,B
00BB 3400        216      ADDC A,#0
00BD C5F0        217      XCH A,B
00BF 2E          218      ADD A,R6
00C0 FB          219      MOV R3,A
00C1 E5F0        220      MOV A,B
00C3 3400        221      ADDC A,#0
00C5 FA          222      MOV R2,A        ;R2,R3 = (T2/TA)*MOD(D(N+1))+C(N+1)
                 223                      ;WT=1 ,SGN IN 20H.7
00C6 8000        224      SJMP LB6
00C8 E9          225 LB6: MOV A,R1        ;NOTE: R0,R1 STILL HOLD MOD(D(N+1))
                 226                      ;WT=2**-8 ,SGN IN 20H.6
00C9 75F008      227      MOV B,#X4       ;LOAD B WITH (DT/TA)*(2**8)
00CC A4          228      MUL AB
00CD A9F0        229      MOV R1,B        ;SAVE MSBYTE DISCARD LSBYTE
00CF E8          230      MOV A,R0
00D0 75F008      231      MOV B,#X4       ;LOAD B WITH (DT/TA)*(2**8) AGAIN
00D3 A4          232      MUL AB
00D4 29          233      ADD A,R1
00D5 F9          234      MOV R1,A
00D6 E5F0        235      MOV A,B
00D8 3400        236      ADDC A,#0
00DA F8          237      MOV R0,A        ;R0,R1 = (DT/TA)*MOD(D(N+1)), WT=2
                 238                      ;SGN IN 20H.6
00DB 8E25        239      MOV 25H,R6      ;SAVE INT(C(N+1) FOR LATER USE
00DD 300609      240      JNB 20H.6,LB60  ;JUMP IF SIGN POS,PROCEED FOR NE
00E0 C3          241      CLR C
00E1 EF          242      MOV A,R7
00E2 99          243      SUBB A,R1
00E3 FF          244      MOV R7,A
00E4 EE          245      MOV A,R6
00E5 98          246      SUBB A,R0
00E6 FE          247      MOV R6,A
```

```
 E7 8009         248        SJMP LB61
 0E9 00          249     LB60: NOP
 00EA EE         250        MOV A,R7
 00EB 29         251        ADD A,R1
 00EC FF         252        MOV R7,A
 00ED EE         253        MOV A,R6
 00EE 38         254        ADDC A,R0
 00EF FE         255        MOV R6,A
 00F0 8000       256        SJMP LB61    ;R6,R7 NOW UPDATED WITH C(N+2)
                 257     ;
                 258     ;
                 259     ;
                 260     ;R2,R3 CONTAINS THE TWO BYTE MODULUS(WT=1) OF
                 261     ;THE D-AXIS CURRENT DEMAND. THE SIGN IS HELD IN
                 262     ;20H.7. BEGIN THE PROCEDURE FOR SCALING THIS
                 263     ;NUMBER BY 1/2 (0.10000000) AND LIMITING THE
                 264     ;RESULT TO 255
 00F2 EB         265     LB61: MOV A,R3
 00F3 75F080     266        MOV B,#X5    ;LOAD B WITH SCALING FRACTION
 00F6 A4         267        MUL AB
 00F7 A9F0       268        MOV R1,B     ;DISCARD LSBYTE SAVE MSBYTE IN R1
 00F9 EA         269        MOV A,R2
 00FA 75F080     270        MOV B,#X5    ;B=SCALING FRACTION AGAIN
 00FD A4         271        MUL AB
 00FE 29         272        ADD A,R1     ;A=NEW LSBYTE + PREVIOUS MSBYTE
 00FF F9         273        MOV R1,A     ;SAVE RESULT
 0100 E5F0       274        MOV A,B
 0102 3400       275        ADDC A,#0
 0104 6004       276        JZ LB7       ;JUMP IF SCALED RESULT < 256
 0106 79FF       277        MOV R1,#0FFH ;SET RESULT TO LIMIT VALUE
 0108 8003       278        SJMP LB8
 010A 00         279     LB7: NOP
 010B 8000       280        SJMP LB8     ;R1=MODULUS OF RESULT
                 281                     ;LIMITED TO 0FFH
                 282     ;************************************
                 283     ;PROCEDURE TO LOOKUP THE LIMIT VALUE FOR THE
                 284     ;MODULUS OF IQ, IQLIM=SQRT((LIM**2)-(ID**2))
                 285     ;FROM LOOKUP TABLE (300-3FF). ENTER WITH
                 286     ;ID (0-FFH) IN R1
 010D 8982       287     LB8: MOV DPL,R1
 010F 758303     288        MOV DPH,#03  ;POINT TO ENTRY IN TABLE
 0112 E4         289        CLR A
 0113 93         290        MOVC A,@A+DPTR ;FETCH LIMIT VALUE
 0114 F5F0       291        MOV B,A      ;SAVE IT TEMPORARILY IN B FOR USE
                 292                     ;IN LIMITING THE IQ VAL
                 293     ;************************************
                 294     ;OUTPUT THE LIMIT VALUE TO PORT 5
 0116 7805       295        MOV R0,#5
 0118 F2         296        MOVX @R0,A
                 297     ;************************************
                 298     ;
                 299     ;START THE PROCEDURE FOR CALCULATING THE SLIP
                 300     ;ANGLE BY INTEGRATION OF THE SLIP FREQUENCY
                 301     ;WHICH IS OBTAINED FROM INPUT OF SPEED REGULATOR
                 302     ;ERROR (TORQUE PER UNIT FLUX, IQ) AND FROM
                 303     ;PSI ( = C(N+1)) STORED IN LOC 25H.
                 304     ;THE FORMULA BEING APPLIED IS AS FOLLOWS:
                 305     ;        THETA=THETA+(IQ*F(PSI))
                 306     ;        WHERE IQ AND PSI ARE IN RANGE +/- 255
                 307     ;        AND F(PSI) IS CONTAINED IN A 2-BYTE
                 308     ;        LOOKUP WITH 2**(-24) WEIGHT.
                 309     ;        THE RESULT OF THE MULT IS A 3-BYTE
                 310     ;        PRODUCT WITH WEIGHT 2**(-24).
                 311     ;        THE LSBYTE IS DISCARDED AND THETA IS
                 312     ;        INCREMENTED
 0119 75D010     313        MOV PSW,#010H ;SELECT REGISTER BANK 2
 011C 7802       314        MOV R0,#2
 011E E2         315        MOVX A,@R0   ;INPUT IQ FROM A/D IN OFFSET BIN.
 011F C3         316        CLR C
 0120 9480       317        SUBB A,#128  ;REMOVE THE OFFSET
 0122 920F       318        MOV 21H.7,C  ;SAVE THE SIGN IN 21H.7
 0124 5003       319        JNC LB30     ;JUMP IF POS.PROCEED FOR NEG.
 0126 F4         320        CPL A
 0127 8003       321        SJMP LB31
 0129 00         322     LB30: NOP
 012A 8000       323        SJMP LB31
```

```
                        324                   ; A=MOD IQ (0-80H)
012C 23                 325     LB31: RL A      ; A=(0-FFH)
012D F9                 326         MOV R1,A    ;DUPLICATE IQ IN R1 FOR LATER
012E C3                 327         CLR C
                        328     ;NOTE:B CONTAINS THE LIMIT VALUE
012F 95F0               329         SUBB A,B
0131 4004               330         JC LB50     ;JUMP IF THE VALUE OF MOD IQ
                        331                     ;IS SMALLER THAN LIMIT
0133 E5F0               332         MOV A,B     ;A=LIMIT VALUE
0135 8003               333         SJMP LB51
0137 E9                 334     LB50: MOV A,R1 ;RETRIEVE THE ORIGINAL VALUE
0138 8000               335         SJMP LB51
013A F9                 336     LB51: MOV R1,A    ;SAVE IN R1
013B F5F0               337         MOV B,A     ; B=MOD IQ
013D E4                 338         CLR A
 13E 852582             339         MOV DPL,25H
 141 758304             340         MOV DPH,#4  ;POINT TO LSBYTE OF F(PSI) TABLE
0144 93                 341         MOVC A,@A+DPTR ;FETCH IT
0145 A4                 342         MUL AB
0146 ABF0               343         MOV R3,B    ;DISCARD LSBYTE OF RESULT
                        344                     ;SAVE MSBYTE IN R3
0148 89F0               345         MOV B,R1    ;RELOAD B WITH MOD IQ
014A 0583               346         INC DPH     ;POINT TO MSBYTE OF F(PSI) TABLE
014C E4                 347         CLR A
014D 93                 348         MOVC A,@A+DPTR ;FETCH IT
014E A4                 349         MUL AB
014F 2B                 350         ADD A,R3    ;ADD LSBYTE TO PREV.RESULT MSBYTE
0150 FB                 351         MOV R3,A
0151 E5F0               352         MOV A,B     ;GET MSBYTE FROM B
0153 3400               353         ADDC A,#0
0155 FA                 354         MOV R2,A    ;R2,R3=THETA INCREMENT(*(2**(-16)))
                        355     ;
                        356     ;   NOTE: R5,R6,R7 HOLD THE THETA
                        357     ;         INTEGRAL (*(2**(-16)))
                        358     ;
0156 200F0D             359         JB 21H.7,LB32  ;JUMP IF THE THETA INC. IS NEG.
0159 00                 360         NOP
015A EF                 361         MOV A,R7
015B 2B                 362         ADD A,R3
015C FF                 363         MOV R7,A
015D EE                 364         MOV A,R6
015E 3A                 365         ADDC A,R2
015F FE                 366         MOV R6,A
0160 ED                 367         MOV A,R5
0161 3400               368         ADDC A,#0
0163 FD                 369         MOV R5,A
0164 800D               370         SJMP LB33   ; R5,R6,R7 NOW UPDATED
                        371                     ;(R5 CONTAINS THE SLIP ANGLE)
0166 C3                 372     LB32: CLR C
0167 EF                 373         MOV A,R7
0168 9B                 374         SUBB A,R3
0169 FF                 375         MOV R7,A
016A EE                 376         MOV A,R6
016B 9A                 377         SUBB A,R2
016C FE                 378         MOV R6,A
016D ED                 379         MOV A,R5
016E 9400               380         SUBB A,#0
0170 FD                 381         MOV R5,A
0171 8000               382         SJMP LB33   ; R5,R6,R7 NOW UPDATED
                        383                     ;(R5 CONTAINS THE SLIP ANGLE)
                        384     ;
                        385     ;**************************************
                        386     ;PROCEDURE TO GENERATE IA AND IC REFERENCE
                        387     ;VALUES FOR OUTPUT. ENTER THIS ROUTINE WITH
                        388     ;IDVAL(0-FFH) IN 01H AND IQVAL(0-FFH) IN 11H
                        389     ;AND SIGN IDVAL IN 20H.7 AND SIGN IQVAL
                        390     ;IN 21H.7 AND A=SLIP ANGLE.
                        391     ;
0173 258A                392     LB33: ADD A,TL0
0175 258A                393         ADD A,TL0
 77 C3                   394         CLR C
 78 958B                 395         SUBB A,TL1   ;A=TOTAL CONTROL FRAME ANGLE
017A F582                396         MOV DPL,A
017C 758306              397         MOV DPH,#6  ;POINT TO SINEWAVE TABLE
                         398     ;
017F 75D018              399         MOV PSW,#18H ;SELECT REGISTER BANK 3
```

```
0182 852022      400      MOV 22H,20H
0185 852123      401      MOV 23H,21H    ;COPY SIGNS OF IDVAL AND IQVAL
0188 8501F0      402      MOV B,01H      ;LOAD B WITH IDVAL
018B 7400        403      MOV A,#0       ;POINT TO SIN(PHI)
018D 93          404      MOVC A,@A+DPTR ;FETCH IT
018E 6220        405      XRL 20H,A      ;20H.7 CONTAINS SIGN FOR
                 406                     ;UPCOMING PRODUCT
0190 C2E7        407      CLR ACC.7
0192 A4          408      MUL AB         ;AB=ID*SIN(PHI)
0193 AFF0        409      MOV R7,B       ;SAVE MSBYTE ONLY
0195 8511F0      410      MOV B,011H     ;LOAD B WITH IQVAL
0198 7440        411      MOV A,#64      ;POINT TO COS(PHI)
19A 93           412      MOVC A,@A+DPTR ;FETCH IT
9B 6221          413      XRL 21H,A      ;21H.7 CONTAINS SIGN FOR
                 414                     ;UPCOMING PRODUCT
019D C2E7        415      CLR ACC.7
019F A4          416      MUL AB         ;AB=IQ*COS(PHI)
                 417      ;NOTE:MUL CLEARS CARRY
01A0 E4          418      CLR A          ;A=0
01A1 300F05      419      JNB 21H.7,LB40
01A4 95F0        420      SUBB A,B       ;RESULT WAS NEG.- SUBTR.MSBYTE
01A6 C3          421      CLR C          ;RESET THE CARRY
01A7 8005        422      SJMP LB41
01A9 25F0        423      LB40: ADD A,B  ;RESULT WAS POS.- ADD MSBYTE
01AB 00          424      NOP
01AC 8000        425      SJMP LB41
01AE 300703      426      LB41: JNB 20H.7,LB42 ;JUMP IF PREVIOUS PRODUCT
                 427                     ;WAS POS. CONT FOR NEG.
01B1 9F          428      SUBB A,R7
01B2 8003        429      SJMP LB43
01B4 2F          430      LB42: ADD A,R7
01B5 8000        431      SJMP LB43
01B7 2480        432      LB43: ADD A,#128  ;A=IA IN 2'S COMPLEMENT + 128
01B9 F4          433      CPL A
01BA 7800        434      MOV R0,#0
01BC F2          435      MOVX @R0,A     ;O/P IA IN COMP.OFF.BIN.TO PORT 0
                 436      ;***********************************
                 437      ;REPEAT THE PRECEDING PROCEDURE FOR CALC.OF IC
                 438      ;
01BD 8501F0      439      MOV B,01H      ;LOAD B WITH IDVAL
01C0 7455        440      MOV A,#85      ;POINT TO SIN(PHI + 120)
01C2 93          441      MOVC A,@A+DPTR ;FETCH IT
01C3 6222        442      XRL 22H,A      ;22H.7 CONTAINS THE SIGN OF
                 443                     ;UPCOMING PRODUCT
01C5 C2E7        444      CLR ACC.7
01C7 A4          445      MUL AB         ;AB=ID*SIN(PHI+120)
01C8 AFF0        446      MOV R7,B       ;SAVE ONLY THE MSBYTE
01CA 8511F0      447      MOV B,11H      ;LOAD B WITH IQVAL
01CD 7495        448      MOV A,#149     ;POINT TO COS(PHI+120)
01CF 93          449      MOVC A,@A+DPTR ;FETCH IT
01D0 6223        450      XRL 23H,A      ;23H.7 CONTAINS THE SIGN OF
                 451                     ;THE UPCOMING PRODUCT
01D2 C2E7        452      CLR ACC.7
01D4 A4          453      MUL AB         ;AB=IQ*COS(PHI+120)
                 454      ;NOTE:MUL CLEARS CARRY
01D5 E4          455      CLR A          ;A=0
01D6 301F05      456      JNB 23H.7,LB44
01D9 95F0        457      SUBB A,B       ;RESULT WAS NEG.,SUBTR. MSBYTE
01DB C3          458      CLR C          ;RESET CARRY
01DC 8005        459      SJMP LB45
01DE 25F0        460      LB44: ADD A,B  ;RESULT WAS POSITIVE, ADD MSBYTE
01E0 00          461      NOP
01E1 8000        462      SJMP LB45
01E3 301703      463      LB45: JNB 22H.7,LB46
01E6 9F          464      SUBB A,R7      ;PREV.PRODUCT WAS NEG.,SUBTR.IT
01E7 8003        465      SJMP LB47
01E9 2F          466      LB46: ADD A,R7 ;PREV.PRODUCT WAS POS., ADD IT
01EA 8000        467      SJMP LB47
01EC 2480        468      LB47: ADD A,#128 ;A=IC IN 2'S COMP PLUS 128
01EE F4          469      CPL A
01EF 7801        470      MOV R0,#1
01F1 F2          471      MOVX @R0,A     ;O/P IC IN COMP.OFF.BIN TO PORT
                 472      ;
                 473      ;***********************************
                 474      ;OUTPUT THE FLUX VALUE C(N+1) TO PORT 4
01F2 7804        475      MOV R0,#4
```

```
01F4 E525           476         MOV  A,25H
01F6 F2             477         MOVX @R0,A
                    478     ;************************************
                    479     ;OUTPUT SELECTED RAM CONTENTS TO TEST PORT
01F7 A890           480         MOV  R0,P1   ;GET SELECTION FROM PORT 1
01F9 E6             481         MOV  A,@R0   ;FETCH CONTENTS
01FA F3             482         MOVX @R1,A   ;O/P TO PORT 6 (NOTE:R1=#6)
01FB 020003         483         LJMP LB11
                    484         END
```

SYMBOL TABLE LISTING
------ ----- -------

| NAME | TYPE | VALUE | ATTRIBUTES |
|---|---|---|---|
| ACC.... | D ADDR | 00E0H | A |
| B...... | D ADDR | 00F0H | A |
| DPH.... | D ADDR | 0083H | A |
| DPL.... | D ADDR | 0082H | A |
| LB1.... | C ADDR | 0795H | A |
| LB11... | C ADDR | 0003H | A |
| LB12... | C ADDR | 0095H | A |
| LB13... | C ADDR | 004EH | A |
| LB14... | C ADDR | 005AH | A |
| LB2.... | C ADDR | 002DH | A |
| B20.... | C ADDR | 0021H | A |
| LB21... | C ADDR | 0028H | A |
| LB30... | C ADDR | 0129H | A |
| LB31... | C ADDR | 012CH | A |
| LB32... | C ADDR | 0166H | A |
| LB33... | C ADDR | 0173H | A |
| LB40... | C ADDR | 01A9H | A |
| LB41... | C ADDR | 01AEH | A |
| LB42... | C ADDR | 01B4H | A |
| LB43... | C ADDR | 01B7H | A |
| LB44... | C ADDR | 01DEH | A |
| LB45... | C ADDR | 01E3H | A |
| LB46... | C ADDR | 01E9H | A |
| LB47... | C ADDR | 01ECH | A |
| LB5.... | C ADDR | 009FH | A |
| LB50... | C ADDR | 0137H | A |
| LB51... | C ADDR | 013AH | A |
| LB6.... | C ADDR | 00C8H | A |
| B60.... | C ADDR | 00E9H | A |
| B61.... | C ADDR | 00F2H | A |
| LB7.... | C ADDR | 010AH | A |
| LB8.... | C ADDR | 010DH | A |
| P1..... | D ADDR | 0090H | A |
| P3..... | D ADDR | 00B0H | A |
| PSW.... | D ADDR | 00D0H | A |
| TCON... | D ADDR | 0088H | A |
| TL0.... | D ADDR | 008AH | A |
| TL1.... | D ADDR | 008BH | A |
| TMOD... | D ADDR | 0089H | A |
| X1..... | NUMB | 003CH | A |
| X2..... | NUMB | 00B4H | A |
| X3..... | NUMB | 002AH | A |
| X4..... | NUMB | 0008H | A |
| X5..... | NUMB | 0080H | A |

REGISTER BANK(S) USED: 0

ASSEMBLY COMPLETE, NO ERRORS FOUND

8031 Code Memory Usage

| Location | Description |
|---|---|
| 000H-1FDH | Control program (constant execution time) |
| 795H-7A4H | Initialization routine |

| | |
|---|---|
| 200H-2FFH | Lookup table (Flux reference vs. speed) |
| 300H-3FFH | Lookup table (ALIM vs. $i_d$ reference) |
| 400H-5FFH | Lookup table (F(psi) vs psi)<br>This table contains precalculated constants which must be multiplied by $i_q$ to obtain the slip integral increments. The values are two-byte numbers. 400H-4FFH = LSByte<br>500H-5FFH = MSByte |
| 600H-794H | Lookup table (Sine(theta) vs. theta)<br>The scaling of theta is determined from the number of shaft encoder pulses per electrical cycle (256). The sine values are stored as modulus values (max.127) and the negative values are indicated by adding 128 (max.255). |

I claim:

1. In an AC motor drive including a three-phase motor, a voltage source having DC terminals of opposite polarities, an inverter connected between said DC terminals and the three phases of the motor, the inverter having three pole switches each for connecting one phase of the motor with one of said terminals, a controller for said pole switches having comparators responsive to the phase currents of the motor and to a corresponding phase current reference for establishing a switching pattern of said pole switches; the combination of:

means responsive to the status of said pole switches for detecting a concurrent switching of said motor phases with a common one of said DC terminals and for generating an enable signal;

means responsive to said motor phase currents for deriving corresponding current derivative representative phase signals;

means responsive to the difference between each of two consecutive said phase signals for selecting one of said pole switches and for generating a command signal to be applied to said selected pole switch when enabled by said enable signal;

said command signal overriding said switching pattern for connecting the motor phase corresponding to said selected pole switch to one predetermined DC terminal during at least one time interval.

2. The motor drive of claim 1 with said time interval being 120 degrees and said predetermined DC terminal being of a selected polarity.

3. The motor drive of claim 1 with two time intervals of 60 degrees being successively established with alternately and successively opposite said predetermined DC terminals.

4. The motor drive of claim 1 with said controller being a bang-bang controller.

5. The motor drive of claim 1 with said current derivative signal deriving means including current transformers coupled to said motor phases for obtaining a representation of the back emf of the motor.

* * * * *